US008908785B2

(12) United States Patent
Kim et al.

(10) Patent No.: US 8,908,785 B2
(45) Date of Patent: Dec. 9, 2014

(54) RECEIVING APPARATUS AND COMMUNICATION APPARATUS, AND COMMUNICATION SYSTEM

(71) Applicant: Renesas Electronics Corporation, Kanagawa (JP)

(72) Inventors: Kichung Kim, Kanagawa (JP); Hiroki Sugimoto, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 13/961,322

(22) Filed: Aug. 7, 2013

(65) Prior Publication Data

US 2014/0079166 A1 Mar. 20, 2014

(30) Foreign Application Priority Data

Sep. 18, 2012 (JP) ................................. 2012-204537

(51) Int. Cl.
*H04K 1/10* (2006.01)
*H04L 27/28* (2006.01)
*H04B 7/12* (2006.01)
*H04B 7/08* (2006.01)

(52) U.S. Cl.
CPC ................ *H04B 7/12* (2013.01); *H04B 7/0857* (2013.01)
USPC ........................................... 375/260; 375/259

(58) Field of Classification Search
USPC ......................................................... 375/260
See application file for complete search history.

(56) References Cited

U.S. PATENT DOCUMENTS

2002/0060990 A1* 5/2002 Bohnke et al. ................. 370/270
2007/0177655 A1* 8/2007 Ktenas et al. .................. 375/144

FOREIGN PATENT DOCUMENTS

| JP | 2006-080624 A | 3/2006 |
| JP | 2006-101245 A | 4/2006 |
| JP | 2006-253915 A | 9/2006 |
| JP | 2010-226233 A | 10/2010 |
| WO | 2006/095513 A1 | 9/2006 |

* cited by examiner

*Primary Examiner* — Erin File
(74) *Attorney, Agent, or Firm* — Mattingly & Malur, PC

(57) ABSTRACT

To improve a quality of a combined signal obtained by maximum ratio combining performed when a transmission signal of OFDM system is diversity-received with a small computation amount or a small circuit size. In a receiving apparatus, a combining unit corrects, when combining a sub-carrier signal of each branch obtained by performing Fourier transform on a reception signal of each branch at a maximum ratio for each sub-carrier, a weighting coefficient of each branch according to a magnitude relation of an intensity of the reception signal of each branch before Fourier transform. Specifically, the combining unit corrects the weighting coefficient of each branch so as to weaken an influence of a transmission path response estimated for a sub-carrier signal of the branch in branches with smaller reception signal intensities.

20 Claims, 15 Drawing Sheets

RECEIVING APPARATUS AND COMMUNICATION APPARATUS, AND COMMUNICATION SYSTEM

CROSS-REFERENCE TO RELATED APPLICATIONS

This application is based upon and claims the benefit of priority from Japanese patent application No. 2012-204537, filed on Sep. 18, 2012, the disclosure of which is incorporated herein in its entirety by reference.

BACKGROUND

The present invention relates to a receiving technique, and more specifically, to a technique of diversity-receiving a transmission signal of Orthogonal Frequency Division Multiplexing (OFDM) system, for example.

The OFDM system is one of multi-carrier transmission systems that divides a transmission signal into a plurality of carrier waves to transmit the signal, and is used in various fields such as digital television broadcasting.

Diversity receiving is performed in mobile terminals or in-vehicle receiving apparatuses employing the OFDM system in order to improve a reception quality.

A receiving apparatus that diversity-receives a transmission signal of OFDM system performs Fourier transform on a reception signal of each branch to obtain 52 sub-carrier signals corresponding to 52 sub-carriers from "−26" to "+26" having different frequencies, as shown in FIG. 15, for each branch for one symbol. A sub-carrier signal of each branch is combined for each sub-carrier by the algorithm called Maximum Ratio Combining (MRC) to obtain a combined signal. Before Fourier transform, automatic frequency control (AFC) that corrects a carrier frequency error is also performed on the reception signal.

Further, Fast Fourier Transform (FFT) is known as an algorithm that performs Fourier transform in a high speed, and FFT processing is typically performed in the receiving apparatus as the Fourier transform.

Techniques from various viewpoints have been proposed for such a receiving apparatus.

For example, Japanese Unexamined Patent Application Publication No. 2006-101245 discloses a technique that mitigates the effects given by variations of a frequency error estimation value for each branch on correction of frequencies. According to this technique, a signal intensity and a frequency error of a signal of each branch are detected in AFC performed on the reception signal before FFT processing. The frequency error of the reception signal of each branch is weighted and combined according to the signal intensity, and a phase of each branch is corrected based on the combined frequency error.

Further, Japanese Unexamined Patent Application Publication Nos. 2006-80624, 2006-253915, and 2010-226233 disclose techniques for improving a quality of a combined signal by modifying a combining method by MRC. Before describing these techniques, the combining method by MRC will be described first.

In the combining method by MRC, a transmission path response (also referred to as a transmission path power or a transfer function) for each sub-carrier of each branch is estimated, and a weighting coefficient to a sub-carrier of each branch is determined based on the transmission path responses that are estimated. A sub-carrier signal of each branch that is weighted is combined for each sub-carrier. When the k-th sub-carrier signal of the i-th symbol of the m-th branch that is subjected to FFT processing is denoted by $S_m(i, k)$, for example, a weighting coefficient $W_m(i, k)$ is calculated for each $S_m(i, k)$, and combining is performed using a result obtained by multiplying each $S_m(i, k)$ by the weighting coefficient $W_m(i, k)$ corresponding to this $S_m(i, k)$.

The weighting coefficient $W_m(i, k)$ is expressed by expression (1). In the expression (1), $H_m(i, k)$ denotes a transmission path response (transfer function) of the k-th sub-carrier of the i-th symbol of the m-th branch, and $H_m^*(i, k)$ denotes the complex conjugation thereof. Further, N denotes the total number of branches.

$$W_m(i, k) = \frac{H_m^*(i, k)}{\sum_{j=1}^{N} |Hj(i, k)|^2} \quad (1)$$

When a combined signal of the k-th sub-carrier of the i-th symbol is denoted by $D(i, k)$, the combined signal $D(i, k)$ can be expressed by expression (2).

$$D(i, k) = \sum_{m=1}^{N} W_m(i, k) \times S_m(i, k) \quad (2)$$
$$= \frac{\sum_{m=1}^{N} H_m^*(i, k) \times S_m(i, k)}{\sum_{j=1}^{N} |H_j(i, k)|^2}$$

As shown in the expression (1), the weighting coefficient $W_m(i, k)$ depends on the amplitude of the transmission path response (transfer function) H. Specifically, in the combining method by MRC, a large weighting coefficient is multiplied by a signal with large amplitude of the transmission path response H, and the signal of the branch is enhanced. However, even when the amplitude of the transmission path response H is large, it does not necessarily mean that the signal of the branch is strong or the C/N ratio of the branch is good.

For example, while a signal of one branch has a poor C/N ratio and small amplitude, the amplitude may increase due to an operation of auto gain control (AGC) and the amplitude of the transmission path response H may increase. When combining is performed by the combining method by MRC in such a case, the C/N ratio of the combined signal becomes poorer than the C/N ratio of the signal of the branch with good C/N ratio due to an influence of a signal of a branch with poor C/N ratio.

The techniques disclosed in Japanese Unexamined Patent Application Publication Nos. 2006-80624 and 2006-253915 calculate a carrier to noise ratio (C/N ratio) of a symbol signal of each branch after FFT processing or a weighted value (first weighted value in Japanese Unexamined Patent Application Publication Nos. 2006-80624 and 2006-253915) based on the relative ratio of these C/N ratios, and multiply the symbol signal of the branch and a transmission path response H estimated for the branch by the weighted value, and then perform combining by MRC.

The technique disclosed in Japanese Unexamined Patent Application Publication No. 2010-226233 determines a level of an interference wave by calculating a modulation error ratio (MER) after FFT processing, weights the signal of each sub-carrier by a weighted value according to the determined level, and then performs MRC combining.

SUMMARY

The techniques disclosed in Japanese Unexamined Patent Application Publication Nos. 2006-80624 and 2006-253915 obtain the C/N ratio for each symbol after FFT processing, which causes a problem that a computation amount increases and the size of the receiving apparatus increases.

The technique disclosed in Japanese Unexamined Patent Application Publication No. 2010-226233 obtains MER for each sub-carrier after FFT processing, which causes a problem that a computation amount increases and the size of the receiving apparatus increases, as is similar to the techniques disclosed in Japanese Unexamined Patent Application Publication Nos. 2006-80624 and 2006-253915.

Other problems and novel features will be made apparent from description of this specification and the accompanying drawings.

According to one embodiment, a receiving apparatus that diversity-receives a transmission signal of OFDM system corrects, when combining a sub-carrier signal of each branch obtained by performing Fourier transform on a reception signal of each branch at a maximum ratio for each sub-carrier, a weighting coefficient of each branch according to a magnitude relation of an intensity of the reception signal of each branch before Fourier transform. Specifically, the receiving apparatus corrects the weighting coefficient of each branch so as to weaken an influence of a transmission path response estimated for a sub-carrier signal of the branch in branches with smaller reception signal intensities.

Note that a method and a system replaced by the receiving apparatus according to the embodiment, a program that causes a computer to execute processing of the receiving apparatus or a part of processing of the receiving apparatus, a communication apparatus that includes the receiving apparatus, a communication system including the receiving apparatus or the communication apparatus and the like are effective as aspects of the present invention.

According to the receiving apparatus in the embodiment stated above, it is possible to improve a quality of a combined signal obtained by maximum ratio combining performed when a transmission signal of OFDM system is diversity-received with small computation amount or small circuit size.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
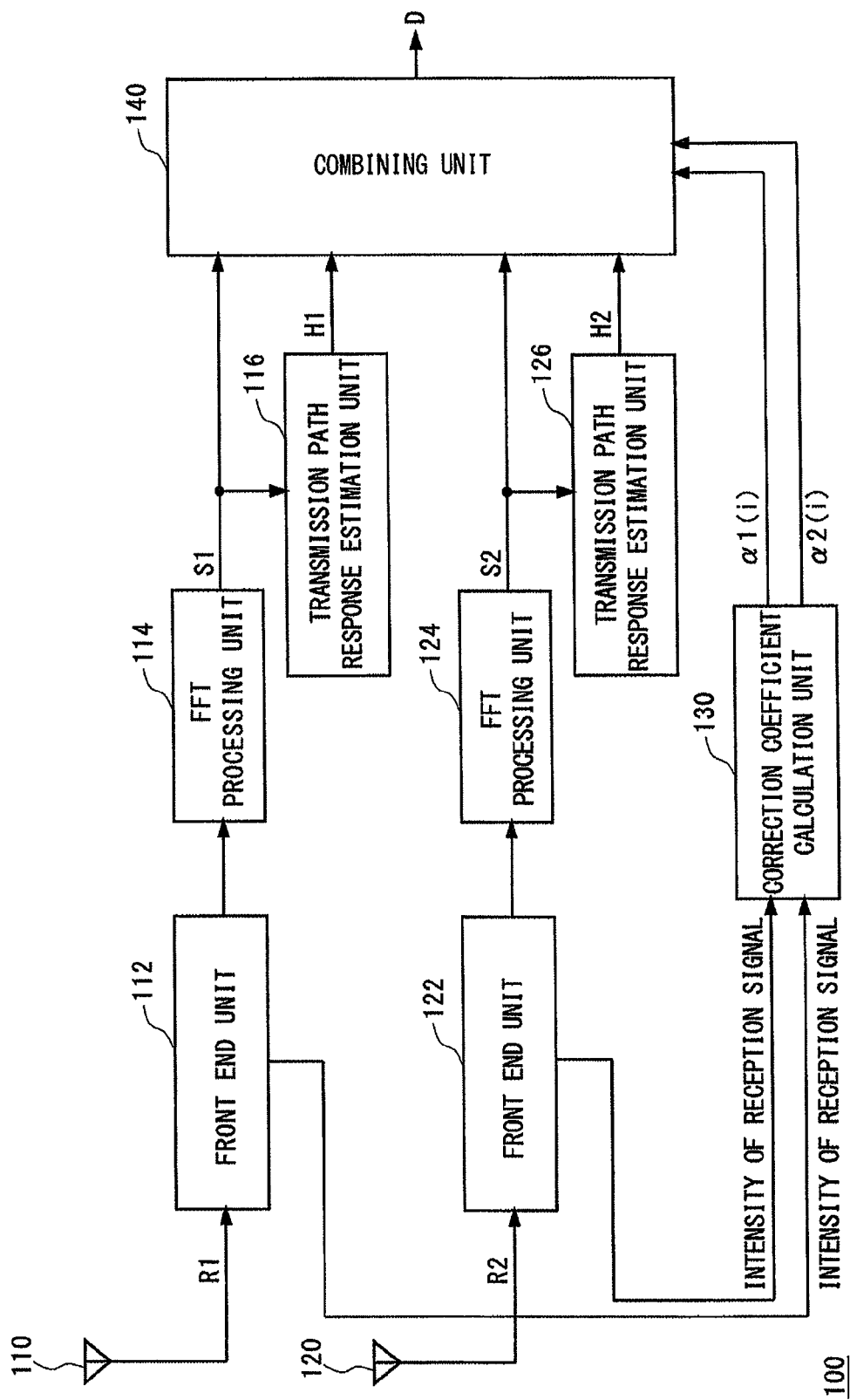
FIG. 1 is a diagram showing a receiving apparatus according to a first embodiment.

For the sake of clarity of description, the following description and the drawings are omitted and simplified as appropriate. Further, each element shown in the drawings as a functional block that performs various processing can be configured by a CPU, a memory, or another circuit in hardware, and is achieved by a program loaded to the memory in software. Accordingly, a person skilled in the art would understand that these functional blocks may be achieved in various ways (e.g., only by hardware, only by software, or the combination thereof) without any limitation. Throughout the drawings, the same elements are denoted by the same reference symbols, and overlapping description is omitted as appropriate.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Any one of the following embodiments relates to a technique of diversity-receiving a transmission signal of OFDM system, and the total number of branches is two, for example. As a matter of course, the technique according to these embodiments may be applied to a case in which the total number of branches is any number equal to or larger than two.

First Embodiment

FIG. 1 shows a receiving apparatus 100 according to a first embodiment. The receiving apparatus 100 diversity-receives a transmission signal of OFDM system. The receiving apparatus 100 includes, for a first branch, an antenna 110, a front end unit 112, an FFT processing unit 114, and a transmission path response estimation unit 116, and for a second branch, an antenna 120, a front end unit 122, an FFT processing unit 124, and a transmission path response estimation unit 126. The receiving apparatus 100 further includes a correction coefficient calculation unit 130 and a combining unit 140. Other functional blocks typically included in this type of receiving apparatus, e.g., a decoder that performs Viterbi decoding on a combined signal D output from the combining unit 140, are omitted in FIG. 1.

First, the first branch of the receiving apparatus 100 will be described.

A signal received by the antenna 110 (reception signal R1 of the first branch) is input to the front end unit 112. The front end unit 112 performs A/D conversion, AGC processing, filter processing, CFO estimation (CFO: CARRIER FREQUENCY OFFSET), synchronization processing or the like on the reception signal R1. A digital signal obtained by the front end unit 112 is input to the FFT processing unit 114.

The FFT processing unit 114 as a Fourier transformer performs FFT processing on the digital signal from the front end unit 112 to convert a time-domain OFDM symbol signal of the first branch into a frequency-domain OFDM symbol signal. One OFDM symbol signal obtained by the FFT processing unit 114 includes a plurality of signals (sub-carrier signals) corresponding to a plurality of (e.g., 52) sub-carriers. Hereinafter, each sub-carrier signal of the first branch is denoted by "S1".

Each sub-carrier signal S1 obtained by the FFT processing unit 114 is input to the combining unit 140, and is also input to the transmission path response estimation unit 116.

The transmission path response estimation unit 116 estimates, for each sub-carrier signal S1, a transmission path response to output the transmission path response to the combining unit 140. The transmission path response obtained by the transmission path response estimation unit 116 is denoted by "H1".

In the similar way for the second branch, a signal received by the antenna 120 (reception signal R2 of the second branch) is first input to the front end unit 122. The front end unit 122 performs A/D conversion, AGC processing, filter processing, CFO estimation, synchronization processing or the like on the reception signal R2, as is similar to the front end unit 112. A digital signal obtained by the front end unit 122 is input to the FFT processing unit 124.

The FFT processing unit 124 as a Fourier transformer performs FFT processing on the digital signal from the front end unit 122 to convert a time-domain OFDM symbol signal of the second branch into a frequency-domain OFDM symbol signal. One OFDM symbol signal obtained by the FFT processing unit 124 also includes a plurality of sub-carrier signals corresponding to respective sub-carriers. Hereinafter, each sub-carrier signal of the second branch is denoted by "S2".

Each sub-carrier signal S2 obtained by the FFT processing unit 124 is input to the combining unit 140, and is also input to the transmission path response estimation unit 126.

The transmission path response estimation unit 126 estimates, for each sub-carrier signal S2, a transmission path response to output the transmission path response to the combining unit 140. The transmission path response obtained by the transmission path response estimation unit 126 is denoted by "H2".

The combining unit 140 performs combining on the sub-carrier signal S1 output from the FFT processing unit 114 and the sub-carrier signal S2 output from the FFT processing unit 124 for each sub-carrier to obtain a combined signal D.

In this type of conventional receiving apparatus, a functional block corresponding to the combining unit 140 obtains a weighting coefficient for each branch from the transmission path response H1 and the transmission path response H2 by maximum ratio combining (hereinafter referred to as "MRC combining") to perform a weighted addition on the sub-carrier signal S1 and the sub-carrier signal S2. An operation expression of the weighted addition by maximum ratio combining will hereinafter be referred to as a "maximum ratio combining operation expression". This maximum ratio combining operation expression is expression (3). Note that the expression (3) is the one in which the aforementioned expression (2) is applied to the case of two branches. The symbols "i" and "k" in the expression (3) denote the number of symbol and the number of sub-carrier, respectively, and the symbols "m" and "j" each denote the number of branch. The same holds true for the following expressions.

$$D(i,k) = \frac{\sum_{m=1}^{N} H_m^*(i,k) \times S_m(i,k)}{\sum_{j=1}^{N} |H_j(i,k)|^2} \qquad (3)$$

$$= \frac{H_1^*(i,k) \times S_1(i,k) + H_2^*(i,k) \times S_2(i,k)}{|H_1(i,k)|^2 + |H_2(i,k)|^2}$$

As will be clear from the expression (3), in this type of conventional receiving apparatus, the weighting coefficient in MRC combining is calculated based on the transmission path response of each branch.

Meanwhile, the receiving apparatus 100 according to this embodiment further includes the correction coefficient calculation unit 130, and the combining unit 140 performs a weighted addition after correcting the weighted coefficient shown by the expression (3) with the correction coefficient ($\alpha 1(i)$, $\alpha 2(i)$) obtained for each branch by the correction coefficient calculation unit 130. Before describing a specific operation by the combining unit 140, the correction coefficient calculation unit 130 will be described first.

The correction coefficient calculation unit 130 obtains the correction coefficient according to the magnitude relation of the intensity of the reception signal of each branch (reception signal R1, reception signal R2). The correction coefficient is smaller in branches with smaller reception signal intensities. The correction coefficients of the first branch and the second branch obtained by the correction coefficient calculation unit 130 are denoted by a first correction coefficient $\alpha 1$ and a second correction coefficient $\alpha 2$, respectively.

When the correction coefficient is calculated, the correction coefficient calculation unit 130 adds a maximum correction coefficient for the branch which has the largest reception signal intensity (hereinafter referred to as a "strongest branch"), for example, and for each of the other branches, obtains a correction coefficient equal to or smaller than the maximum correction coefficient according to the difference in the intensity between the branch and the strongest branch. Description will now be made taking a case in which the maximum correction coefficient is "1" as an example.

First, a case in which the reception signal intensity is measured from the reception signal R1 and the reception signal R2 before A/D conversion will be described. In an analog signal before A/D conversion, it is impossible to know which symbol it corresponds to. One method in this case is to apply the correction coefficient calculated from the reception signal intensity that is measured to all the following symbols.

In this case, the correction coefficient calculation unit 130 calculates the first correction coefficient $\alpha 1$ and the second correction coefficient $\alpha 2$ according to the following expression (4A).

$$\mathit{diffA} = \mathrm{abs}(Q1 - Q2) \tag{4A}$$

$$\text{if } \left(Q1 >= Q2 \; \alpha 1 = 1, \; \alpha 2 = \left(\frac{1}{10^{\frac{\mathit{diffA}}{10}}}\right)\right)$$

$$\text{else } \alpha 1 = \left(\frac{1}{10^{\frac{\mathit{diffA}}{10}}}\right), \; \alpha 2 = 1$$

In expression (4A), "Q1" and "Q2" denote the reception signal intensities of the reception signal R1 and the reception signal R2, respectively, and "diffA" denotes an absolute value of the difference between the reception signal intensity Q1 and the reception signal intensity Q2.

As will be clear from the expression (4A), when the branch which has a large reception signal intensity (strongest branch) is the first branch (Q1>=Q2), the correction coefficient calculation unit 130 adds the maximum correction coefficient "1" to the first branch. Thus, the first correction coefficient α1 becomes "1". Further, the correction coefficient calculation unit 130 calculates, for the second branch, the second correction coefficient α2 from "diffA".

On the other hand, when the strongest branch is the second branch ("else" or "Q1<Q2"), the correction coefficient calculation unit 130 adds the maximum correction coefficient "1" to the second branch. Thus, the second correction coefficient α2(i) becomes "1". Further, the correction coefficient calculation unit 130 calculates, for the first branch, the first correction coefficient al from "diffA".

For example, the reception signal intensities of the reception signal R1 and the reception signal R2 before A/D conversion are continuously measured, and when there is no change in the intensities, the correction coefficients obtained from the reception signal intensities that are measured are applied to all the symbols. Meanwhile, when there is a change in the reception signal intensities, the correction coefficients obtained from the reception signal intensities after the change may be applied to the following symbols.

Alternatively, the reception signal intensities of the reception signal R1 and the reception signal R2 before A/D conversion are periodically measured at some predetermined interval, and the correction coefficients may be updated every time the measurement is made.

In order to obtain a better correction effect, it is preferable to measure the reception signal intensity of the reception signal of each branch for each symbol to obtain the correction coefficient for each symbol. In this case, the measurement of the intensities of the reception signals is performed after A/D conversion and synchronization processing.

Specifically, for example, it is possible to obtain the reception signal intensity of each symbol of each branch based on the reception signal intensities obtained when the front end unit 112 and the front end unit 122 perform AGC processing. The reception signal intensity obtained when the AGC processing is performed corresponds to the reception signal intensity of the short preamble included in the synchronization signal of the top of each frame. Accordingly, by measuring a variation amount of the received power with elapse of time from the short preamble for each frame and adding the resulting variation amount to the reception signal intensity of the frame, it is possible to obtain the reception signal intensity of each symbol of the frame. The reception signal intensities obtained in the AGC processing will be described later in detail in the second embodiment.

In this case, the correction coefficient calculation unit 130 calculates the first correction coefficient α1 and the second correction coefficient α2 according to the following expression (4B), for example.

$$\mathit{diffA}(i) = \mathrm{abs}(Q1(i) - Q2(i)) \tag{4B}$$

$$\text{if } (Q1(i) >= Q2(i)) \; \alpha 1(i) = 1, \; \alpha 2(i) = \left(\frac{1}{10^{\frac{\mathit{diffA}(i)}{10}}}\right)$$

$$\text{else } \alpha 1(i) = \left(\frac{1}{10^{\frac{\mathit{diffA}(i)}{10}}}\right), \; \alpha 2(i) = 1$$

In the expression (4B), "Q1(i)" and "Q2(i)" denote the intensity of the i-th symbol in the reception signal R1 and the intensity of the i-th symbol in the reception signal R2 after A/D conversion, respectively, and "diffA(i)" denotes an absolute value of the difference between the intensity Q1(i) and the intensity Q2(i).

As will be clear from the expression (4B), when the strongest branch is the first branch (Q1(i)>=Q2(i)), the correction coefficient calculation unit 130 adds the maximum correction coefficient "1" to the first branch. Thus, the first correction coefficient α1(i) becomes "1". Further, the correction coefficient calculation unit 130 calculates, for the second branch, the second correction coefficient α2(i) from "diffA(i)".

Meanwhile, when the strongest branch is the second branch ("else" or "Q1(i)<Q2(i)", the correction coefficient calculation unit 130 adds the maximum correction coefficient "1" to the second branch. Thus, the second correction coefficient α2(i) becomes "1". Further, the correction coefficient calculation unit 130 calculates, for the first branch, the first correction coefficient α1(i) from "diffA(i)".

Each of the symbols Q1(i) and Q2(i) that are the intensities of the i-th symbols in the reception signal R1 and the reception signal R2 may be, for example, the average intensity in the time axis of the symbol, the intensity at any position of the symbol (e.g., top or middle point).

When combining the sub-carrier signals S1 and S2 by a weighted addition, the combining unit 140 obtains a weighting coefficient so as to weaken an influence of the transmission path response of the sub-carrier signal of the branch in branches with smaller correction coefficients obtained by the correction coefficient calculation unit 130 to perform combining. Some specific examples of the combining method by the combining unit 140 will now be described. An expression indicating the operation by the combining unit 140 will hereinafter be referred to as a "combining operation expression".

For example, the combining unit 140 corrects each term of the numerator and the denominator of the maximum ratio combining operation expression (expression (3)) with a correction coefficient calculated for the branch corresponding to the term by the correction coefficient calculation unit 130.

Specifically, for example, as shown in expression (5) which is a combining operation expression, the combining unit 140 multiplies each term of the numerator and the denominator of the maximum ratio combining operation expression by the correction coefficient of the branch corresponding to the term.

$$D(i, k) = \frac{\sum_{m=1}^{N} \alpha_m(i) \times H_m^*(i, k) \times S_m(i, k)}{\sum_{j=1}^{N} (\alpha_j(i) \times |H_j(i, k)|^2)} \tag{5}$$

$$= \frac{\alpha_1(i) \times H_1^*(i, k) \times S_1(i, k) + \alpha_2(i) \times H_2^*(i, k) \times S_2(i, k)}{\alpha_1(i) \times |H_1(i, k)|^2 + \alpha_2(i) \times |H_2(i, k)|^2}$$

Alternatively, the combining unit 140 may correct, as shown in a combining operation expression shown in expression (6), the transmission path response of each branch by multiplying it by the correction coefficient of the branch, to combine the sub-carrier signal of each branch at a maximum ratio using the transmission path response of each branch after the correction.

$$D(i,k) = \frac{\sum_{m=1}^{N} \alpha_m(i) \times H_m^*(i,k) \times S_m(i,k)}{\sum_{j=1}^{N} |\alpha_j(i) \times H_j(i,k)|^2} \quad (6)$$

$$= \frac{\alpha_1(i) \times H_1^*(i,k) \times S_1(i,k) + \alpha_2(i) \times H_2^*(i,k) \times S_2(i,k)}{|\alpha_1(i) \times H_1(i,k)|^2 + |\alpha_2(i) \times H_2(i,k)|^2}$$

Figure 2:
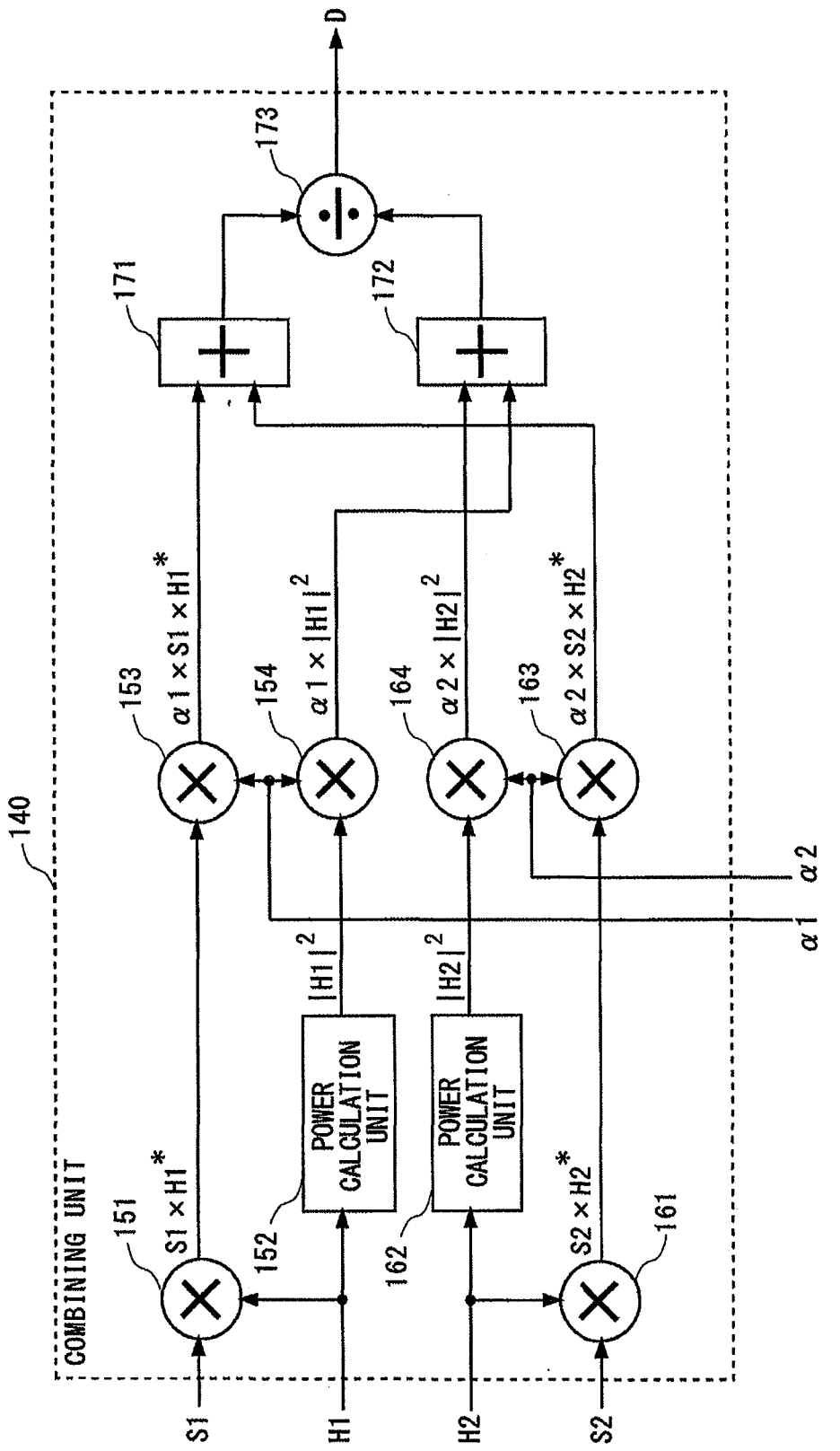
FIG. 2 is a diagram showing a configuration example of a combining unit in the receiving apparatus shown in FIG. 1.

FIG. 2 shows a configuration example of the combining unit 140. The combining unit 140 shown in FIG. 2 performs a weighted addition on the sub-carrier signal S1 and the sub-carrier signal S2 by the operation shown in the expression (5), and includes a multiplication unit 151, a power calculation unit 152, a multiplier 153, a multiplier 154, a multiplier 161, a power calculation unit 162, a multiplier 163, a multiplier 164, an adder 171, an adder 172, and a divider 173.

The multiplication unit 151 multiplies the sub-carrier signal S1 by a complex conjugation of the transmission path response H1 to output the obtained value to the multiplier 153. The power calculation unit 152 calculates the square of the amplitude of the transmission path response H1 ($|H1|^2$) to output the obtained value to the multiplier 154. The multiplier 153 multiplies the first correction coefficient α1 from the correction coefficient calculation unit 130 by the output from the multiplication unit 151 to output the obtained value to the adder 171. The output from the multiplier 153 is one term of the two terms of the numerator part in expression (5). Further, the multiplier 154 multiplies the first correction coefficient α1 by the output from the power calculation unit 152 to output the obtained value to the adder 172. The output from the multiplier 154 is one term of the two terms of the denominator part in expression (5).

The multiplier 161 multiplies the sub-carrier signal S2 by a complex conjugation of the transmission path response H2 to output the obtained value to the multiplier 163. The power calculation unit 162 calculates the square of the amplitude of the transmission path response H2 ($|H2|^2$) to output the obtained value to the multiplier 164. The multiplier 163 multiplies the second correction coefficient α2 from the correction coefficient calculation unit 130 by the output from the multiplication unit 161 to output the obtained value to the adder 171. The output from the multiplier 163 is the other term of the two terms of the numerator part in expression (5). The multiplier 164 multiplies the second correction coefficient α2 by the output from the power calculation unit 162 to output the obtained value to the adder 172. The output from the multiplier 164 is the other term of the two terms of the denominator part in expression (5).

The adder 171 adds outputs of the multiplier 153 and the multiplier 163 to obtain the numerator part in expression (5), and the adder 172 adds outputs of the multiplier 154 and the multiplier 164 to obtain the denominator part in expression (5). The divider 173 then divides the output from the adder 171 by the output from the adder 172 to obtain the combined signal D.

As will be clear from the description above, the combining unit 140 corrects the weighting coefficient of the maximum ratio combining so as to weaken the influence of the transmission path response estimated for the sub-carrier signal of the branch in branches with smaller reception signal intensities according to the magnitude relation of the intensity of the reception signal of each branch before FFT processing.

It is generally considered that, the lower the intensity of the reception signal is, the smaller a signal to noise ratio (SNR) is. When combining the sub-carrier signal of each branch for each sub-carrier at a maximum ratio, the receiving apparatus 100 according to this embodiment weakens the influence given by the transmission path response estimated for the branch on the weighting coefficient in branches with smaller reception signal intensities or smaller SNR according to the magnitude relation of the intensities of the reception signals between branches, thereby being able to improve the quality of the combined signal D.

Further, the receiving apparatus 100 acquires correction coefficients according to the intensities of the reception signals before Fourier operation, and applies the same correction coefficients to all the sub-carrier signals included in the same symbol. It is therefore not required to obtain the C/N ratio for each symbol unlike the techniques disclosed in Japanese Unexamined Patent Application Publication Nos. 2006-80624 and 2006-253915, and to obtain MER for each sub-carrier as disclosed in Japanese Unexamined Patent Application Publication No. 2010-226233. It is therefore possible to suppress increases in the computation amount and the circuit size.

Furthermore, the technique disclosed in Japanese Unexamined Patent Application Publication No. 2010-226233 requires calculation of MER for each sub-carrier. In order to obtain MER, it is required to compare an ideal constellation position with IQ positions (positions in an IQ coordinate system) for each sub-carrier to obtain the difference. It is possible to determine MER with some extent of accuracy even with low SNR when the modulation system of Binary Phase Shift Keying (BPSK)/Quaternary Phase Shift Keying (QPSK) is used. When the modulation system of Quadrature Amplitude Modulation (QAM) is used, however, intervals between constellation points are narrow. When the SNR is low, there is a high possibility that comparison is made with a non-ideal constellation position, which degrades the calculation accuracy of MER. The effect of this technique thus depends on the modulation system, and some modulation systems may reduce a quality of a combined signal.

Meanwhile, the receiving apparatus 100 according to this embodiment obtains the correction coefficient of each branch according to the intensities of the reception signals before Fourier transform, thereby being able to improve the quality of the combined signal without depending on the modulation system.

Second Embodiment

Before describing a second embodiment, a frame format of a transmission signal of OFDM system will be described first.

Figure 3:
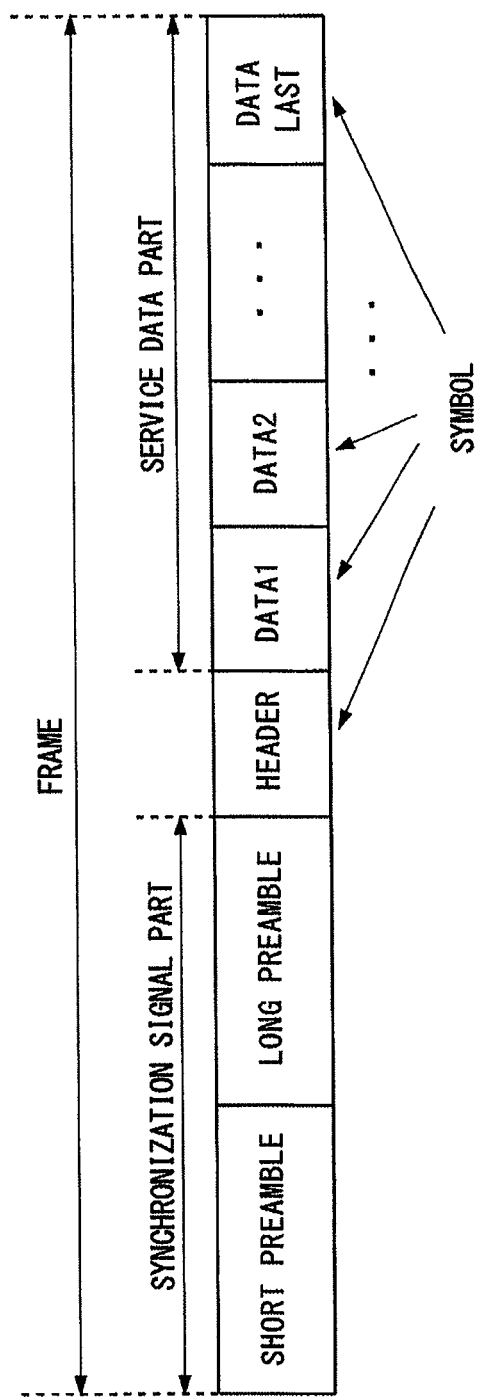
FIG. 3 is a diagram showing a frame format of a transmission signal of OFDM system.

FIG. 3 shows a frame format of a transmission signal of OFDM system. For the sake of clarity, in FIG. 3, GUARD INTERVAL (GI) provided between regions is omitted.

As shown in FIG. 3, one frame of the transmission signal of OFDM system includes a synchronization signal part, a header, and a service data part arranged in time series. The synchronization signal part includes a short preamble and a long preamble. The header includes information including a data rate and a data length. The service data part includes a plurality of pieces of data (divided data) from the top DATA1 to the last DATA LAST. The header corresponds to one symbol, and one piece of divided data also corresponds to one symbol.

The receiving apparatus 100 according to the first embodiment described above obtains a correction coefficient of each branch according to the magnitude relation of the intensity of the reception signal of each branch before Fourier transform to use the correction coefficients when obtaining a combined signal after Fourier transform.

When measuring the reception intensities from the reception signals before A/D conversion, for example, the receiving apparatus 100 measures the intensity of the reception signal of each branch, and uses the correction coefficient obtained according to the measured intensity for combination of each of the following symbols.

Alternatively, when obtaining the correction coefficient for each symbol of each branch, for example, the receiving apparatus 100 obtains, for one symbol ("DATA1"), the correction coefficient for each branch according to the magnitude relation of the intensity of the symbol "DATA1" of each branch. The receiving apparatus 100 then corrects, when performing a weighted addition on the sub-carrier signal of each branch for each sub-carrier for the symbol "DATA1" after Fourier operation, the weighting coefficient of each branch with the correction coefficient obtained for each branch.

Further, for another symbol ("DATA2"), the correction coefficient is obtained for each branch according to the magnitude relation of the intensity of the symbol in the reception signal of each branch. The receiving apparatus 100 then corrects, when performing a weighted addition on the sub-carrier signal of each branch for each sub-carrier for the symbol "DATA2" after Fourier operation, the weighting coefficient of each branch with the correction coefficient obtained for each branch.

In summary, in this case, the receiving apparatus 100 obtains the correction coefficient of each branch for each symbol, and uses each correction coefficient that is obtained to combine the sub-carrier signal corresponding to the symbol.

The aforementioned correction coefficient may be obtained for each frame, not for each symbol. For example, according to the magnitude relation of the intensity of each frame corresponding to each branch before Fourier transform and after synchronization processing, smaller correction coefficients are obtained in branches with smaller frame intensities. When the sub-carrier signals are combined, each correction coefficient thus obtained is applied to all the symbols of the frame.

The "intensity of the frame" may be, for example, the intensity of a predetermined part of the frame (e.g., synchronization signal part).

According to this technique, it is sufficient that one correction coefficient is calculated for one frame, thereby being able to reduce the computation amount compared to the case in which the correction coefficient is obtained for each symbol.

More preferably, the intensity of the short preamble is regarded as the intensity of the frame, the correction coefficient is obtained from the intensity of the short preamble of each branch, and the correction coefficients are applied to all the symbols of the frame. In such a case, it is possible to further suppress the circuit size and the computation amount to obtain the correction coefficients. The reason for this will now be described.

In the receiving apparatus that receives a transmission signal of OFDM system, a reception signal is converted into a digital signal by A/D conversion, and the digital signal is then subjected to a Fourier transform. In order to obtain a sub-carrier signal of optimal amplitude that is easily demodulated, in A/D conversion, adjustment of a gain is typically performed by processing called Auto Gain Control (AGC).

The aforementioned AGC is performed based on the signal of the short preamble part. In short, the gain of the frame at the time of the A/D conversion is determined according to the intensity of the short preamble.

In summary, the reception signal intensity of the short preamble is obtained in the AGC. Accordingly, when the correction coefficient is obtained using the reception signal intensity of the short preamble obtained in the AGC, there is no need to additionally provide means for obtaining the intensity of the reception signal, thereby being able to reduce the computation amount and the circuit size.

Based on the aforementioned description, the second embodiment will be described.

Figure 4:
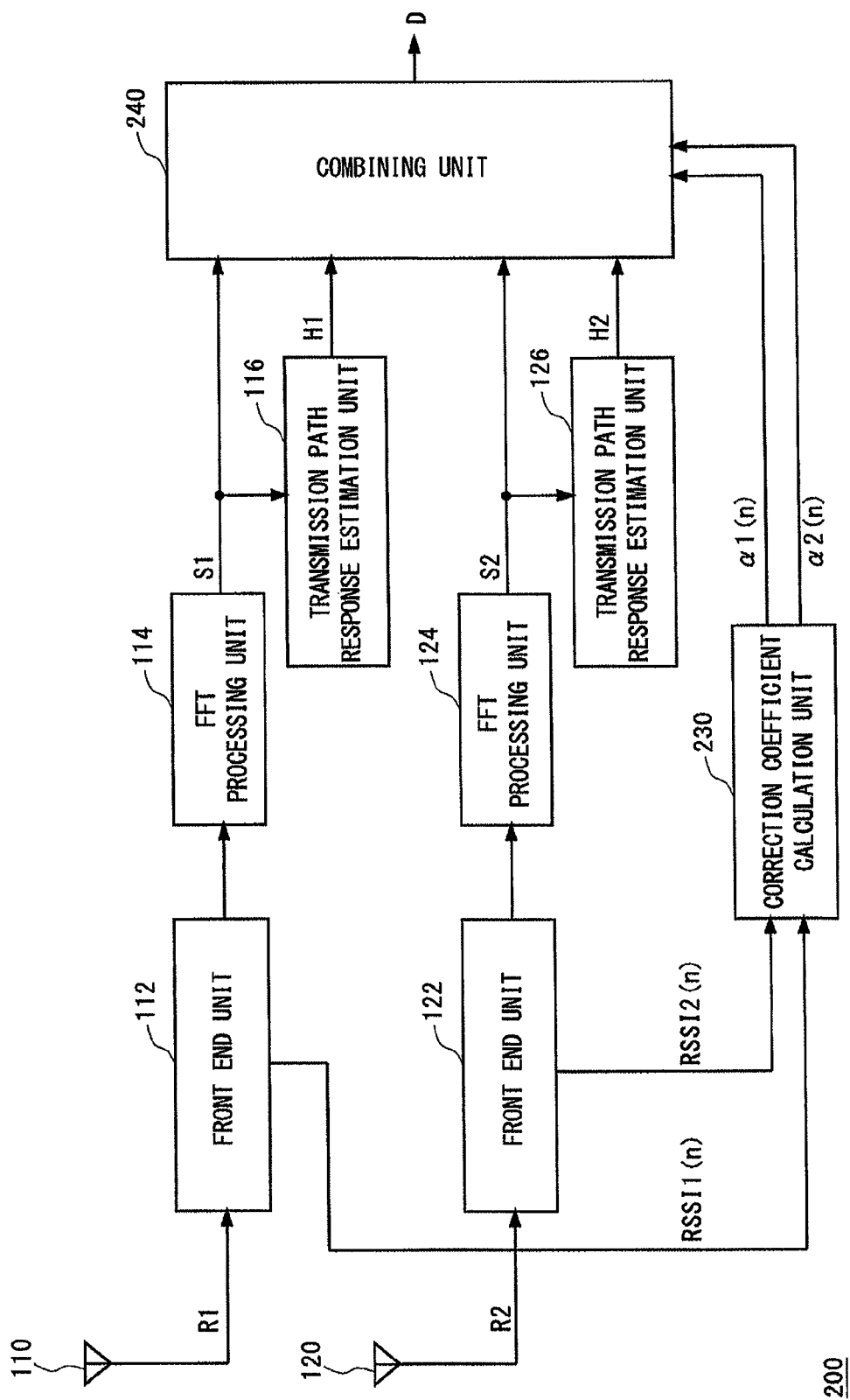
FIG. 4 is a diagram showing a receiving apparatus according to a second embodiment.

FIG. 4 shows a receiving apparatus 200 according to the second embodiment. The receiving apparatus 200 also diversity-receives a transmission signal of OFDM system, and is similar to the receiving apparatus 100 except that a correction coefficient calculation unit 230 and a combining unit 240 are provided in place of the correction coefficient calculation unit 130 and the combining unit 140. Only the points related to the correction coefficient calculation unit 230 and the combining unit 240 of the receiving apparatus 200 will be described here.

In the receiving apparatus 200, the correction coefficient calculation unit 230 obtains, for each frame, the correction coefficient of each branch based on the reception signal intensities obtained when the front end unit 112 and the front end unit 122 perform AGC processing to output the correction coefficients to the combining unit 240.

Hereinafter, the reception signal intensities obtained when the front end unit 112 and the front end unit 122 perform AGC processing are denoted by $RSSI1(n)$ and $RSSI2(n)$, respectively, and the correction coefficients calculated for the first branch and the second branch by the correction coefficient calculation unit 230 are denoted by $\alpha 1(n)$ and $\alpha 2(n)$, respectively. The symbol n denotes the number of the frame.

The front end unit 112 and the front end unit 122 are similar to those typically included in this type of receiving apparatus. These configurations will be described taking the front end unit 112 as an example.

Figure 5:
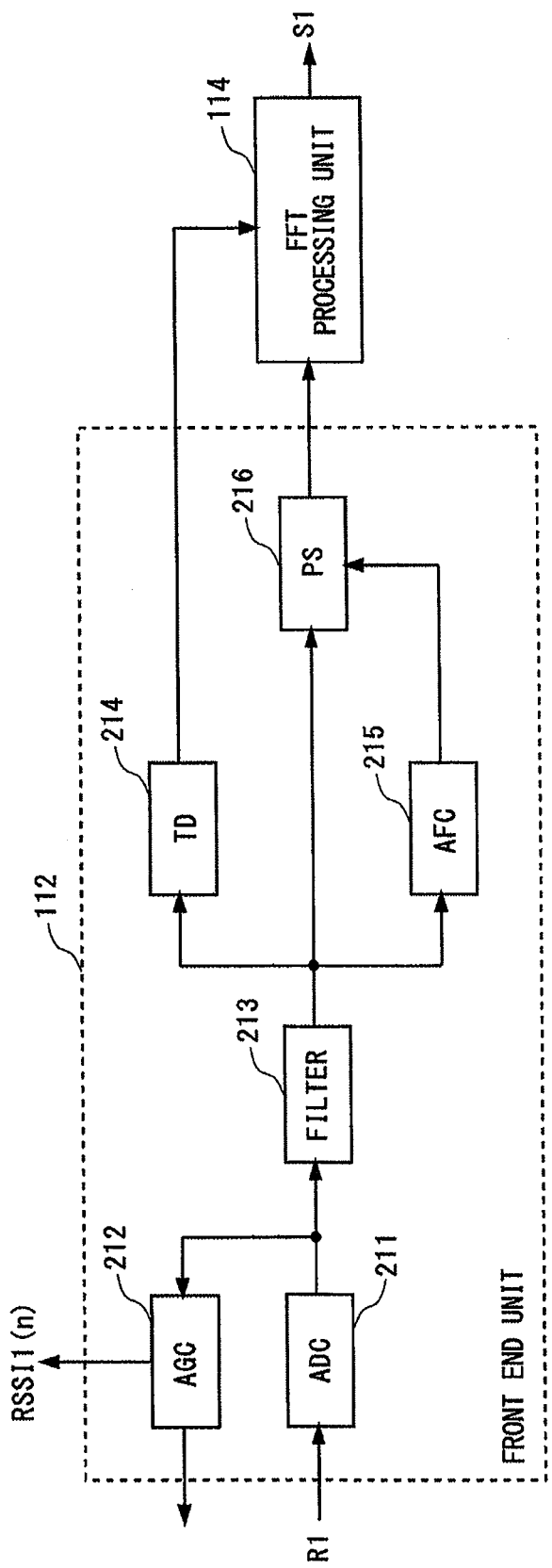
FIG. 5 is a diagram showing a front end unit in the receiving apparatus shown in FIG. 4.

FIG. 5 shows the front end unit 112. The front end unit 112 includes an A/D converter 211, an AGC unit 212, a filter 213, an LP position estimation unit 214, an AFC unit 215, and a phase correction unit 216.

The A/D converter 211 is shown as ADC in FIG. 5, and converts the reception signal R1 of the first branch into a digital signal.

The AGC unit 212 performs AGC based on the amplitude of the short preamble part in the digital signal output from the A/D converter 211, to adjust the gain of the reception signal R1 supplied to the A/D converter 211. Further, in AGC, the AGC unit 212 obtains $RSSI1(n)$. In this exemplary embodiment, this $RSSI1(n)$ is output to the correction coefficient calculation unit 230.

The filter 213 is a low-pass filter, filters the digital signal from the A/D converter 211, and outputs the filtered signal to the LP position estimation unit 214 (LP: Long Preamble) and the AFC unit 215.

The LP position estimation unit (in FIG. 5, TD: TIMING DETECTION) 214 detects the last position of the short preamble from the signal output from the filter 213, estimates the start position of the long preamble, and notifies the FFT processing unit 114 of the start position.

The AFC unit (in FIG. 5, AFC: Automatic Frequency Control) 215 estimates a CFO using the short preamble and the long preamble in the signal output from the filter 213.

The phase correction unit (in FIG. 5, PS: PHASE SHIFT) 216 performs phase correction on the signal output from the filter 213 based on the CFO estimated by the AFC unit 215.

The information indicating the start position of the long preamble estimated by the LP position estimation unit 214 and the signal obtained by correcting the phase by the phase correction unit 216 are input to the FFT processing unit 114. The FFT processing unit 114 performs FFT processing on the signal output from the filter 213 based on the start position of the long preamble estimated by the LP position estimation unit 214, to obtain the sub-carrier signal S1 of each symbol of the frame.

The front end unit 122 performs the similar processing as the front end unit 112 on the reception signal R2 of the second branch. As a result, RSSI2(n) is obtained from the front end unit 122. This RSSI2(n) is also output to the correction coefficient calculation unit 230.

Referring back to FIG. 4, description will be made.

The correction coefficient calculation unit 230 calculates, for each frame, the correction coefficient which becomes smaller in branches with smaller reception signal intensities according to the magnitude relation between RSSI1(n) and RSSI2(n).

For example, the correction coefficient calculation unit 230 adds, for the branch which has the largest reception signal intensity (strongest branch), the maximum correction coefficient, and obtains, for each of the other branches, the correction coefficient which is equal to or smaller than the maximum correction coefficient according to the difference in the intensity between the branch and the strongest branch. Now, description will be made taking a case in which the maximum correction coefficient is "1" as an example.

In this case, the correction coefficient calculation unit 230 calculates the first correction coefficient $\alpha 1(n)$ and the second correction coefficient $\alpha 2(n)$ according to the following expression (7), for example.

$$diffA(n) = abs(RSSI1(n) - RSSI2(n)) \quad (7)$$

$$\text{if } (RSSI1(n) >= RSSI2(n)) \; \alpha 1(n) = 1, \; \alpha 2(n) = \left(\frac{1}{10^{\frac{diffA(n)}{10}}}\right)$$

$$\text{else } \alpha 1(n) = \left(\frac{1}{10^{\frac{diffA(n)}{10}}}\right), \; \alpha 2(n) = 1$$

As will be clear from the expression (7), for the n-th frame, when the strongest branch is the first branch (RSSI1(n) >=RSSI2(n)), the correction coefficient calculation unit 230 adds the maximum correction coefficient "1" to the first branch. Thus, the first correction coefficient $\alpha 1(n)$ becomes "1". Further, the correction coefficient calculation unit 230 calculates, for the second branch, the correction coefficient ($\alpha 2(n)$) from the absolute value "diffA(n)" of the difference between RSSI1(n) and RSSI2(n).

On the other hand, when the strongest branch is the second branch ("else" or "RSSI1(n)<RSSI2(n)"), the correction coefficient calculation unit 230 adds the maximum correction coefficient "1" to the second branch. Thus, the second correction coefficient $\alpha 2(n)$ becomes "1". Further, the correction coefficient calculation unit 230 calculates, for the first branch, the correction coefficient ($\alpha 1(n)$) from "diffA(n)"

When combining the sub-carrier signals S1 and S2 by a weighted addition, the combining unit 240 obtains a weighting coefficient so as to weaken the influence of the transmission path response of the sub-carrier signal of the branch in branches with smaller correction coefficients obtained by the correction coefficient calculation unit 230 to perform combining.

In the receiving apparatus 100, the combining unit 140 applies the correction coefficient calculated for each symbol by the correction coefficient calculation unit 130 to each sub-carrier of the symbol. Meanwhile, the combining unit 240 applies the correction coefficient calculated for each frame by the correction coefficient calculation unit 230 to each sub-carrier of all the symbols of the frame. Except for this point, the specific combining method by the combining unit 240 is similar to that in the combining unit 140.

Expressions (8) and (9) are examples of combining operation expressions used by the combining unit 240 when performing combining operations. These expressions (8) and (9) correspond to the combining operation expressions by the combining unit 140 (expressions (5) and (6)), respectively.

$$D(i,k) = \frac{\sum_{m=1}^{N} \alpha_m(n) \times H_m^*(i,k) \times S_m(i,k)}{\sum_{j=1}^{N} (\alpha_j(n) \times |H_j(i,k)|^2)} \quad (8)$$

$$= \frac{\alpha_1(n) \times H_1^*(i,k) \times S_1(i,k) + \alpha_2(n) \times H_2^*(i,k) \times S_2(i,k)}{\alpha_1(n) \times |H_1(i,k)|^2 + \alpha_2(n) \times |H_2(i,k)|^2}$$

$$D(i,k) = \frac{\sum_{m=1}^{N} \alpha_m(n) \times H_m^*(i,k) \times S_m(i,k)}{\sum_{j=1}^{N} (\alpha_j^2(n) \times |H_j(i,k)|^2)} \quad (9)$$

$$= \frac{\alpha_1(n) \times H_1^*(i,k) \times S_1(i,k) + \alpha_2(n) \times H_2^*(i,k) \times S_2(i,k)}{\alpha_1^2(n) \times |H_1(i,k)|^2 + \alpha_2^2(n) \times |H_2(i,k)|^2}$$

As will be clear from the expressions (8) and (9), in the combining unit 240, the correction coefficients ($\alpha 1(n)$ and $\alpha 2(n)$) calculated for each frame by the correction coefficient calculation unit 230 are applied to all the sub-carriers of all the symbols of the frame.

In this way, the receiving apparatus 200 is able to obtain each effect of the receiving apparatus 100 and to further reduce the computation amount compared to the receiving apparatus 100.

Third Embodiment

In an environment in which received power (intensity of a reception signal) is generally low, SNR of a reception signal in either branch is relatively low. Thus a quality of a combined signal obtained by maximum ratio combining is degraded due to an influence of the branch having lower SNR among these branches. The aforementioned receiving apparatus 100 and the receiving apparatus 200 solve this problem by correcting each term of the maximum ratio combining operation expression with the correction coefficient according to the magnitude relation of the intensity of the reception signal of each branch.

On the other hand, in an environment in which received power is generally high, SNR of a reception signal in either branch is relatively high. When the environment with high received power is compared with the environment with low received power for one branch, a degree that the branch degrades the combined signal is lower in the environment with high received power even when the difference between the received power of the branch and the received power of the strongest branch is the same.

Further, in fading environments such as in mobile terminals or in-vehicle receiving apparatuses, the magnitude relation of the intensity of the synchronization signal part of the reception signal does not necessarily match the magnitude relation of the intensity of the reception signal of the service data part between branches. Due to this reason, when the correction coefficients obtained according to the magnitude relation of the intensity of the synchronization signal part of the reception signal of the frame corresponding to each branch are applied to all the symbols of the frame, this may cause degradation in the quality of the combined signal. This problem is more significant in environments with high received power.

Figure 6:
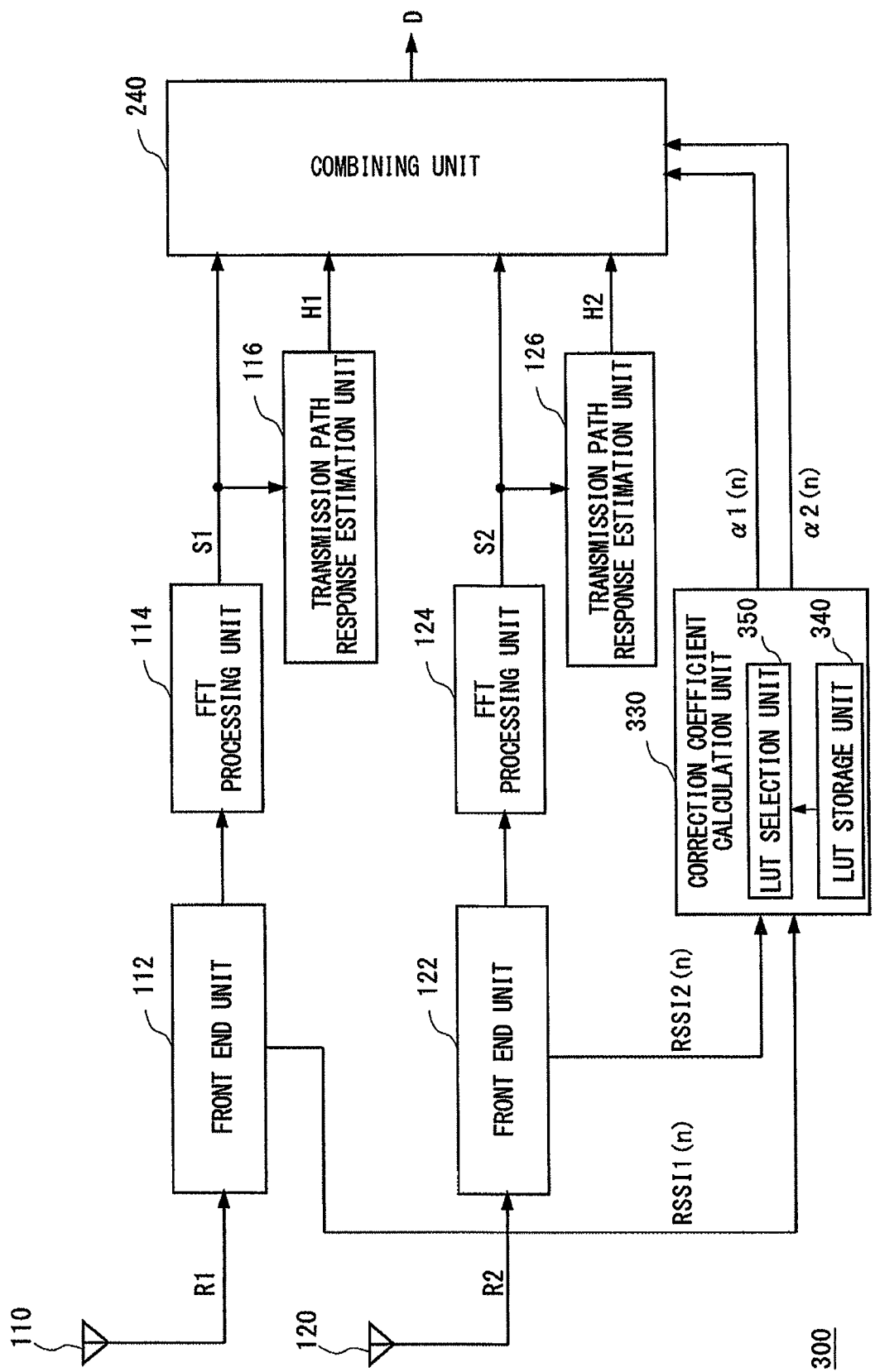
FIG. 6 is a diagram showing a receiving apparatus according to a third embodiment.

In order to solve this problem, the receiving apparatus 300 according to the third embodiment is obtained by improving the performance of the receiving apparatus 200. As shown in FIG. 6, the receiving apparatus 300 is similar to the receiving apparatus 200 except that the correction coefficient calculation unit 330 is provided in place of the correction coefficient calculation unit 230. Accordingly, only the correction coefficient calculation unit 330 of the receiving apparatus 300 will be described.

Before describing a specific configuration of the correction coefficient calculation unit 330, a method of calculating correction coefficients by the correction coefficient calculation unit 330 will be described first.

The correction coefficient calculation unit 330 calculates, as is similar to the correction coefficient calculation unit 230 in the receiving apparatus 200, for each branch, a correction coefficient of each branch based on the reception signal intensity of each branch. Further, the correction coefficient calculation unit 330 adds the maximum correction coefficient "1" for the branch which has the largest reception signal intensity (strongest branch), and for each of the other branches, obtains the correction coefficient which is equal to or smaller than 1 according to the difference in the intensities of the reception signals of the branch and the strongest branch. This point is also similar to the correction coefficient calculation unit 230.

When the correction coefficient calculation unit 230 is used, the same correction coefficients are obtained if the difference in the intensities of the reception signals between each of the branches and the strongest branch is the same. On the other hand, when the correction coefficient calculation unit 330 is used, different correction coefficients are obtained when the intensity of the reception signal of the strongest branch itself is different even when the difference in the intensities of the reception signals between each of the branches and the strongest branch is the same.

More specifically, the correction coefficient calculation unit 330 obtains correction coefficients so that the correction coefficients are larger as the intensity of the reception signal of the strongest branch is larger under a condition that the correction coefficient becomes smaller as the difference in the intensities of the reception signals between each of the branches other than the strongest branch and the strongest branch is larger. Expression (10) shows one example of calculation methods by the correction coefficient calculation unit 330.

$$diffA(n) = \mathrm{abs}(RSSI1(n) - RSSI2(n)) \quad (10)$$

$$diffB(n) = diffA(n) - \mathrm{offset}$$

if $(RSSI1(n) >= RSSI2(n))$ $\alpha 1(n) = 1$, $\alpha 2(n) = \left(\frac{1}{10^{\frac{diffB(n)}{10}}}\right)$ else $\alpha 1(n) = \left(\frac{1}{10^{\frac{diffB(n)}{10}}}\right)$, $\alpha 2(n) = 1$ if $(\alpha 1(n) > 1)$ $\alpha 1(n) = 1$, if $(\alpha 2(n) > 1)$ $\alpha 2(n) = 1$ As will be clear from the expression (10), when the strongest branch is the first branch for the n-th frame ($RSSI1(n) >= RSSI2(n)$), the correction coefficient calculation unit 330 adds the maximum correction coefficient "1" to the first branch. Thus, the first correction coefficient $\alpha 1(n)$ becomes "1". Further, the correction coefficient calculation unit 330 calculates, for the second branch, the correction coefficient ($\alpha 2(n)$) from diffB(n) (hereinafter referred to as a "difference B") obtained by subtracting the offset value (offset in the expression) from the absolute value "diffA(n)" of $RSSI1(n)$ and $RSSI2(n)$. When the correction coefficient $\alpha 2(n)$ that is calculated is larger than 1, the correction coefficient calculation unit 330 sets the correction coefficient $\alpha 2(n)$ to "1".

Meanwhile, when the strongest branch is the second branch ("else" or "$RSSI1(n)<RSSI2(n)$"), the correction coefficient calculation unit 330 adds the maximum correction coefficient "1" to the second branch. Thus, the second correction coefficient $\alpha 2(n)$ becomes "1". Further, the correction coefficient calculation unit 330 calculates, for the first branch, the correction coefficient ($\alpha 1(n)$) from the difference B(diffB (n)) obtained by subtracting the offset value from "diffA(n)". When the correction coefficient $\alpha 1(n)$ that is calculated is larger than 1, the correction coefficient calculation unit 330 sets the correction coefficient $\alpha 1(n)$ to "1".

The offset value in the expression (10) is a value equal to or larger than 0 set according to the intensity of the reception signal of the strongest branch. Specifically, a larger offset value is set as the intensity of the reception signal of the strongest branch is larger.

Accordingly, the difference B used to obtain the correction coefficient becomes smaller than the original difference diffA (n) as the intensity of the reception signal of the strongest branch becomes larger. Thus, the correction coefficient becomes larger than the correction coefficient calculated by diffA(n).

Specifically, the correction coefficient calculation unit 330 uses the intensity of the reception signal of the strongest branch as an index value indicating the intensity of the received power of the whole reception environment, and as the intensity of the reception signal of the strongest branch becomes larger, the correction intensity by the correction coefficient obtained from the intensity of the reception signal of each of the other branches is weakened.

According to this operation, it is possible to correct the weighting coefficient according to the strength of the received power of the whole reception environment when the combined signal is obtained, thereby being able to further increase the quality of the combined signal and to suppress degradation of the quality of the combined signal also in a fading environment.

Based on the aforementioned description, a specific configuration of the correction coefficient calculation unit 330 will be described.

As shown in FIG. 6, the correction coefficient calculation unit 330 includes a LUT storage unit 340 and a LUT selection unit 350.

The LUT storage unit 340 stores a plurality of look up tables (LUTs). Each of the LUTs associates the correction coefficient and diffA to calculate the correction coefficient of each of the branches other than the strongest branch.

Figure 7:
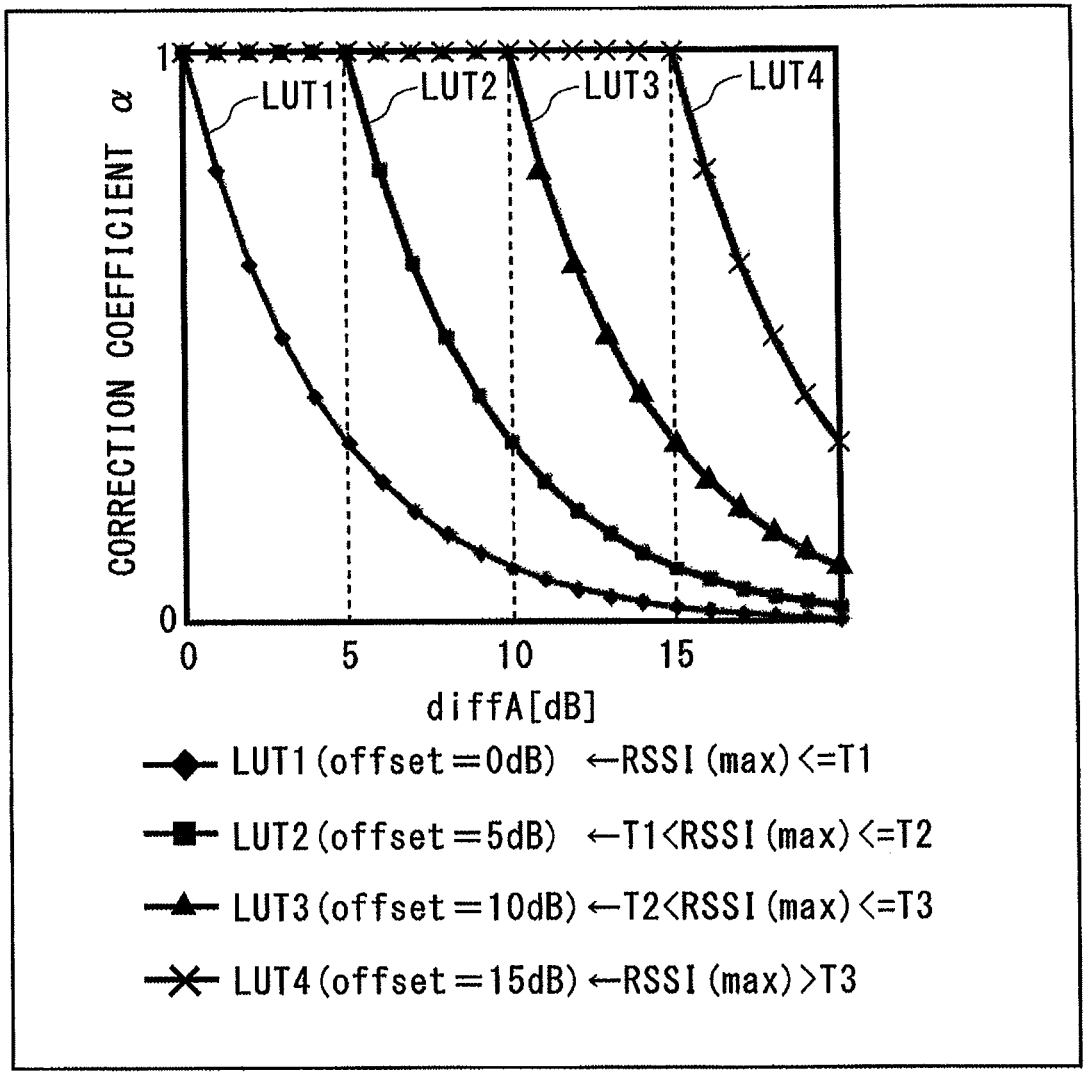
FIG. 7 is a diagram showing an example of LUTs used by a correction coefficient calculation unit of the receiving apparatus shown in FIG. 6.

FIG. 7 shows an example of four LUTs (LUT1 to LUT4) stored in the LUT storage unit 340. LUT1 is a correction coefficient calculated for each diffA (the absolute value of the difference in the intensities of the reception signals between each of the branches and the strongest branch) according to the expression (10) when the offset is set to 0 dB. LUT2 is a correction coefficient calculated for each diffA according to the expression (10) when the offset is set to 5 dB. LUT3 is a correction coefficient calculated for each diffA according to the expression (10) when the offset is set to 10 dB. LUT4 is a correction coefficient calculated for each diffA according to the expression (10) when the offset is set to 15 dB. While the number of LUTs is not limited to four, about four LUTs are appropriately provided since further increase in the number of LUTs approaches properties of single reception too much.

The LUT selection unit 350 in the CORRECTION COEFFICIENT CALCULATION UNIT 330 selects one of LUT1 to LUT4 according to the intensity of the reception signal of the strongest branch (RSSI(max)). For example, when RSSI(max) is equal to or smaller than the threshold T1, the LUT selection unit 350 selects LUT (LUT1) corresponding to the minimum offset (0 dB).

Further, when RSSI(max) is larger than the threshold T1 and is equal to or smaller than the threshold T2, the LUT selection unit 350 selects a LUT (LUT2) corresponding to the second smallest offset (5 dB). Similarly, when RSSI(max) is larger than the threshold T2 and is equal to or smaller than the threshold T3, the LUT selection unit 350 selects LUT3, and when RSSI(max) is larger than the threshold T3, the LUT selection unit 350 selects LUT4 corresponding to the maximum offset (15 dB).

The correction coefficient calculation unit 330 adds the correction coefficient "1" for the strongest branch, and for each of the other branches, obtains the correction coefficient corresponding to diffA(n) using the LUT selected by the LUT selection unit 350.

Figure 8:
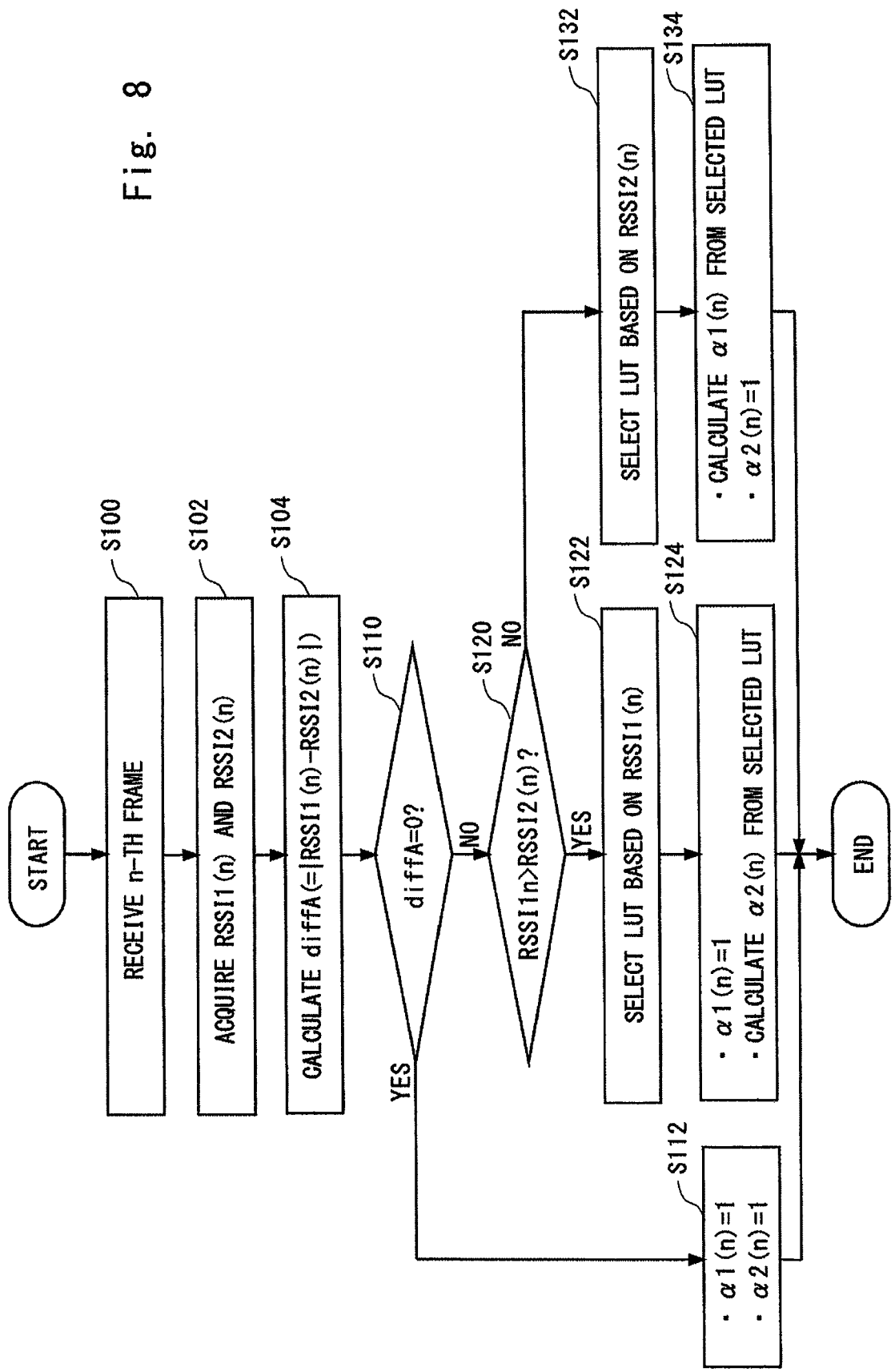
FIG. 8 is a flowchart showing calculation processing of correction coefficients by the correction coefficient calculation unit of the receiving apparatus shown in FIG. 6.

FIG. 8 is a flowchart of processing of calculating correction coefficients for the n-th frame by the correction coefficient calculation unit 330 in the receiving apparatus 300. Upon receiving the n-th frame (S100), the correction coefficient calculation unit 330 acquires RSSI1($n$) and RSSI2($n$) of the frame from the front end unit 112 and the front end unit 122 to calculate the absolute value diffA of the difference between RSSI1($n$) and RSSI2($n$) (S102, S104).

When there is no difference between RSSI1($n$) and RSSI2($n$) (S110: Yes), the correction coefficient calculation unit 330 adds "1" to both of the first correction coefficient $\alpha 1(n)$ and the second correction coefficient $\alpha 2(n)$ (S112). As a result, the combining unit 240 performs combining with a maximum ratio combining operation expression when obtaining the combined signal D for each sub-carrier for each symbol of the frame.

Meanwhile, when there is a difference between RSSI1($n$) and RSSI2($n$) (S110: No), the correction coefficient calculation unit 330 performs the following operation. That is, when the strongest branch is the first branch (S120: Yes), the correction coefficient calculation unit 330 sets RSSI1($n$) as RSSI (max) and selects one LUT from LUT1 to LUT4 based on RSSI1($n$) (S122). Then, the correction coefficient calculation unit 330 adds "1" to the first correction coefficient $\alpha 1(n)$, and selects the correction coefficient corresponding to diffA calculated in step S104 as the second correction coefficient $\alpha 2(n)$ from the LUT that is selected in step S122 (S124). As a result, the combining unit 240 performs combining with a combining operation expression obtained by correcting each term corresponding to the second branch in the numerator and the denominator of the maximum ratio combining operation expression by the second correction coefficient $\alpha 2(n)$ when obtaining the combined signal D for each sub-carrier for each symbol of the frame.

When the strongest branch is the second branch (S120: No), the correction coefficient calculation unit 330 sets RSSI2($n$) as RSSI(max) and selects one LUT from LUT1 to LUT4 based on RSSI2($n$) (S132). Then, the correction coefficient calculation unit 330 adds "1" to the second correction coefficient $\alpha 2(n)$, and selects, from the LUT selected in step S132, the correction coefficient corresponding to diffA calculated in step S104 as the first correction coefficient $\alpha 1(n)$ (S134). As a result, the combining unit 240 performs combining with a combining operation expression obtained by correcting each term corresponding to the first branch in the numerator and the denominator of the maximum ratio combining operation expression by the first correction coefficient $\alpha 1(n)$ when obtaining the combined signal D for each sub-carrier for each symbol of the frame.

Fourth Embodiment

As described above, the correction coefficient calculation unit 330 in the receiving apparatus 300 according to the third embodiment specifies an intensity range of the intensity of the reception signal of the strongest branch (RSSI(max)) based on the thresholds T1 to T3 to select a LUT to calculate the correction coefficient. In this example, an embodiment including a configuration regarding setting of the thresholds T1 to T3 will be described.

Figure 9:
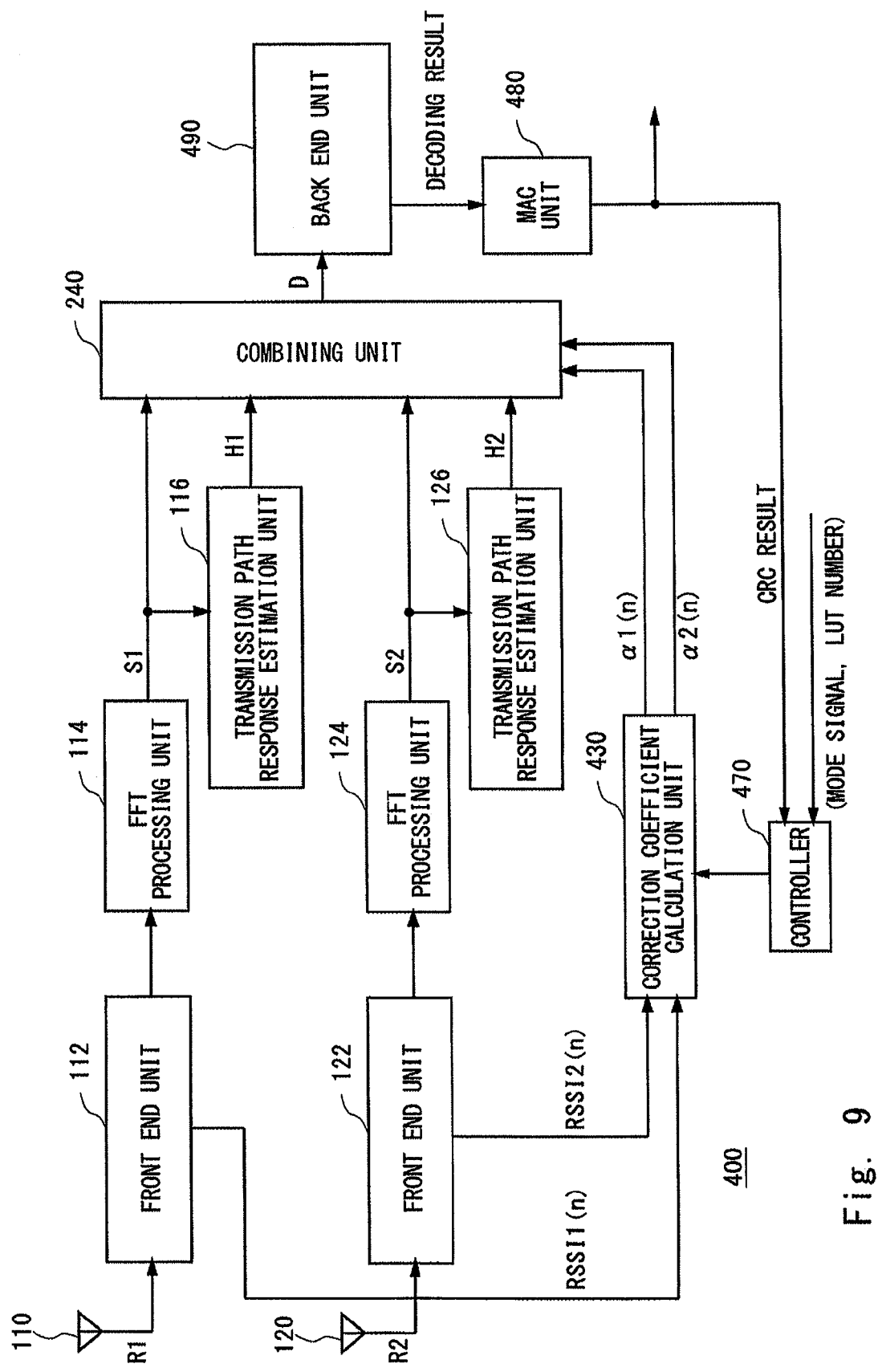
FIG. 9 is a diagram showing a receiving apparatus according to a fourth embodiment.

FIG. 9 shows a receiving apparatus 400 according to a fourth embodiment. The receiving apparatus also 400 also diversity-receives a transmission signal of OFDM system. Only the difference from the receiving apparatus 300 will be described here. Further, an operation of the receiving apparatus 400 only at a time of threshold adjustment will be described.

In the receiving apparatus 400, a correction coefficient calculation unit 430 is provided in place of the correction coefficient calculation unit 330. Further, since the correction coefficient calculation unit 430 uses a decoding result of a combined signal D when adjusting thresholds T1 to T3 in the receiving apparatus 400, a back end unit 490 that performs processing such as decoding of the combined signal D is shown in FIG. 9. The back end unit 490 includes a decoder such as a Viterbi decoder that is typically included in this type of receiving apparatus. Further, the receiving apparatus 400 includes a controller 470 to input various types of information described later to the correction coefficient calculation unit 430, and a MAC unit 480 (MAC: Media Access Control) that performs Cyclic Redundancy Check (CRC) processing on the decoding result output from the back end unit 490 to output the result (OK or NG). The result of the CRC processing by the MAC unit 480 is also input to the controller 470.

Further, the antenna 110 and the antenna 120 are connected to the outside by lines. When thresholds are set, the antenna 110 and the antenna 120 are supplied with the reception signal R1 and the reception signal R2 from the outside through a wired connection, respectively, and output these signals to the front end unit 112 and the front end unit 122.

The controller 470 receives a mode signal and a LUT number (in this example, four from 1 to 4) from the outside, and receives results of CRC processing from the MAC unit 480.

The correction coefficient calculation unit 430 also receives various types of data from the controller 470 in addition to RSSI1(*n*) and RSSI2(*n*). Information input to the correction coefficient calculation unit 430 from the controller 470 will be described together with a detailed configuration of the correction coefficient calculation unit 430.

Figure 10:
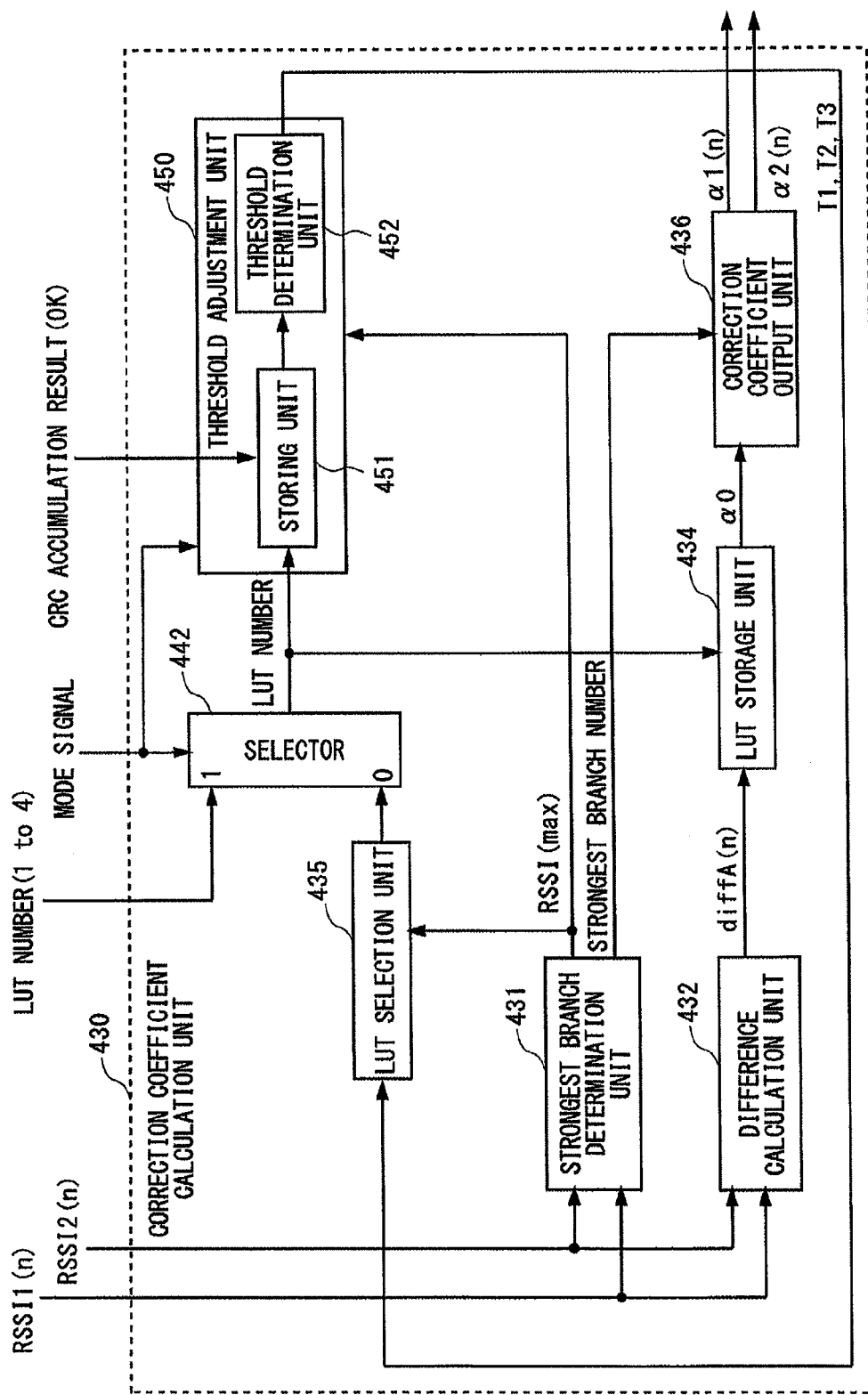
FIG. 10 is a diagram showing a correction coefficient calculation unit in the receiving apparatus shown in FIG. 9.

FIG. 10 shows a configuration example of the correction coefficient calculation unit 430. The correction coefficient calculation unit 430 includes a strongest branch determination unit 431, a difference calculation unit 432, a LUT storage unit 434, a LUT selection unit 435, a correction coefficient output unit 436, a selector 442, and a threshold adjustment unit 450. The threshold adjustment unit 450 includes a storing unit 451 and a threshold determination unit 452.

The mode signal is a signal that indicates an operation mode of the correction coefficient calculation unit 430. The mode signal "1" indicates a "threshold adjustment mode", and the mode signal "0" indicates a "normal operation mode". This mode signal is input to the controller 470 from the outside, and is transmitted to the correction coefficient calculation unit 430 by the controller 470.

In the normal operation mode, the correction coefficient calculation unit 430 performs the similar operation as the correction coefficient calculation unit 330 in the receiving apparatus 300.

In the threshold adjustment mode, the correction coefficient calculation unit 430 adjusts the threshold T1 to the threshold T3 that specify the range of the intensity of RSSI (max) to select LUT1 to LUT4.

Each functional block of the correction coefficient calculation unit 430 will be described in detail.

The strongest branch determination unit 431 receives RSSI1(*n*) and RSSI2(*n*), selects one of RSSI1(*n*) and RSSI2(*n*) which is larger one (RSSI(max)), outputs (RSSI(max)) to the LUT selection unit 435, and outputs the number of the branch (strongest branch number) to the correction coefficient output unit 436.

The difference calculation unit 432 receives RSSI1(*n*) and RSSI2(*n*), calculates the absolute value diffA(n) of the difference between RSSI1(*n*) and RSSI2(*n*), and outputs the absolute value diffA(n) to the LUT storage unit 434.

The LUT storage unit 434 stores four LUTs that are similar to LUT1 to LUT4 stored in the LUT storage unit 340 of the correction coefficient calculation unit 330 in the receiving apparatus 300. The LUT storage unit 434 selects the correction coefficient ($\alpha 0$) corresponding to diffA from the difference calculation unit 432 from the LUT indicated by the LUT number from the selector 442 to output the correction coefficient ($\alpha 0$) to the correction coefficient output unit 436.

The correction coefficient output unit 436 outputs "1" as the correction coefficient of the branch (strongest branch) which is the first branch or the second branch indicated by the strongest branch number from the strongest branch determination unit 431, and outputs the correction coefficient $\alpha 0$ from the LUT storage unit 434 as the correction coefficient of the branch different from the strongest branch.

The value RSSI(max) output from the strongest branch determination unit 431 is also input to the LUT selection unit 435. The LUT selection unit 435 holds a threshold T1 to a threshold T3. Then, the LUT selection unit 435 specifies the range of RSSI(max) based on these thresholds to select one LUT from LUT1 to LUT4. The LUT selection unit 435 outputs the number of the LUT that is selected to the selector 442. Further, when receiving the threshold T1 to the threshold T3 from the threshold adjustment unit 450, the LUT selection unit 435 updates respective thresholds held therein with the thresholds T1 to T3 that are received.

When the thresholds are set, numbers 1 to 4 indicating LUT1 to LUT4, respectively, are successively input to the controller 470 from the outside. The controller 470 transfers the number input from the outside to the selector 442 of the correction coefficient calculation unit 430.

The selector 442 selects and outputs one of the LUT number from the controller 470 and the output from the LUT selection unit 435 according to the mode signal. More specifically, when the mode signal is "1", the selector 442 outputs the LUT number from the controller 470. When the mode signal is "0", the selector 442 outputs the number from the LUT selection unit 435. The LUT number output from the selector 442 is input to the LUT storage unit 434 and the threshold adjustment unit 450.

The threshold adjustment unit 450 operates only when the mode signal is "1", and outputs the threshold T1 to the threshold T3 to the LUT selection unit 435.

The storing unit 451 of the threshold adjustment unit 450 receives the CRC accumulation result from the controller 470 and stores the CRC accumulation result. This CRC accumulation result is obtained by the controller 470 by accumulating the check results of "OK" among the results of CRC processing obtained from the MAC unit 480. In the following description, a result obtained by accumulating the CRC processing results of "OK" will be simply referred to as a "CRC accumulation result".

The storing unit 451 stores the LUT number from the selector 442 associated with RSSI(max) from the strongest branch determination unit 431.

Figure 11:
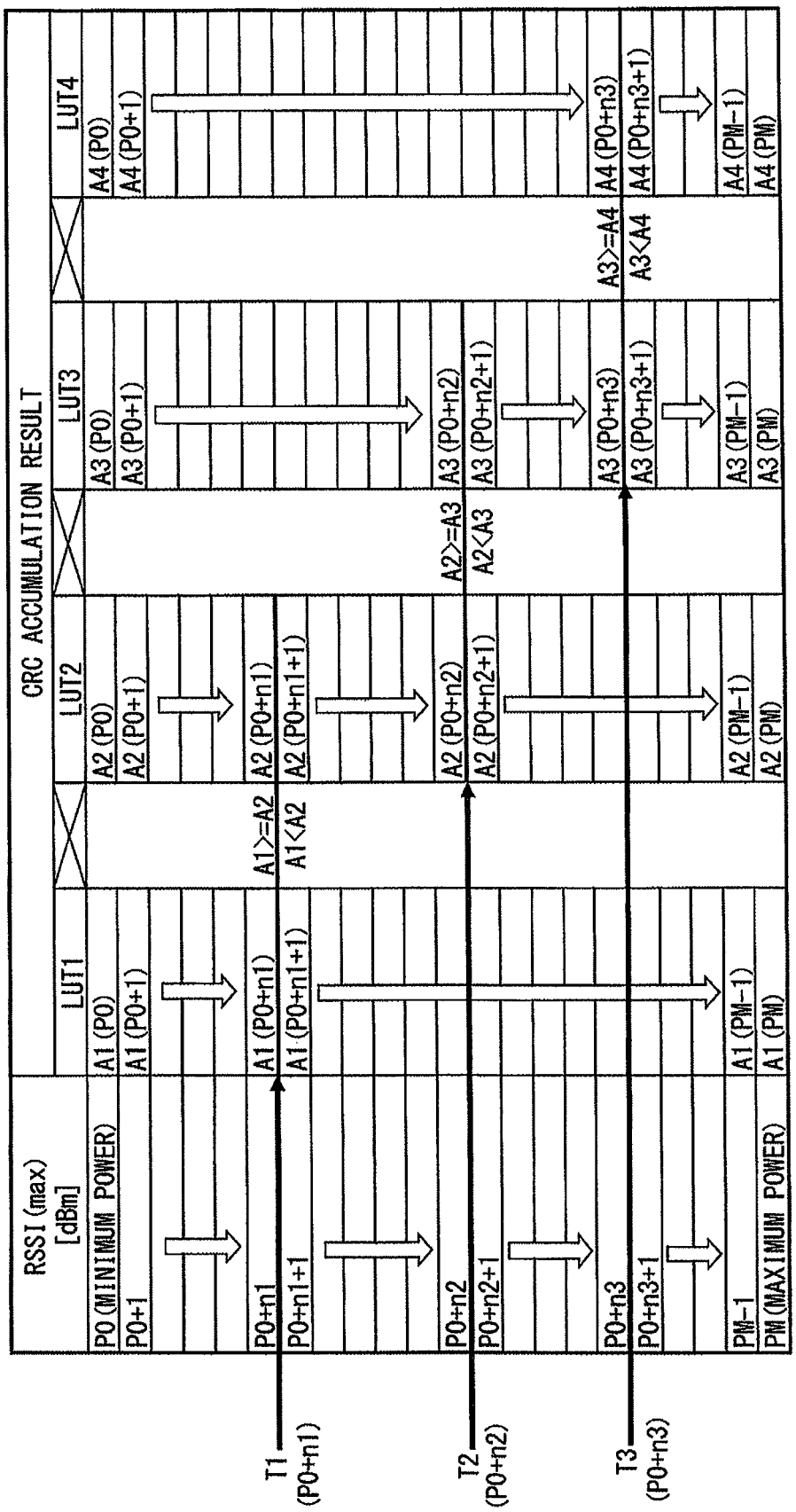
FIG. 11 is a diagram for describing a determination method of thresholds used by the correction coefficient calculation unit shown in FIG. 10 when selecting a LUT.

The threshold determination unit 452 determines the threshold T1 to the threshold T3 based on the data stored in the storing unit 451 to output the threshold T1 to the threshold T3 to the LUT selection unit 435. Referring to FIG. 11, a specific method when the threshold determination unit 452 determines the threshold T1 to the threshold T3 will be described.

FIG. 11 shows examples of data acquired and stored by the storing unit 451. In FIG. 11, the leftmost column shows the intensity of the reception signal of the strongest branch (RSSI (max)), in which the minimum value and the maximum value are P0 and PM, respectively. The symbols A1, A2, A3, and A4 are CRC accumulation results, and the numbers following A indicate the numbers of LUTs used when the CRC accumulation results are obtained. Further, the alphanumeric characters in parentheses following A1, A2 and the like are RSSI (max) when the CRC accumulation results are obtained. For example, A1(P0) indicates the CRC accumulation result when RSSI(max) is P0 and LUT1 is used.

The threshold determination unit 452 determines the threshold T1 to the threshold T3 from the data shown in FIG. 11. Specifically, the CRC accumulation result is compared between LUT1 and LUT2, and RSSI(max) in the boundary where the magnitude relation of the CRC accumulation results is reversed is determined as the threshold T1. In the example shown in FIG. 11, A1 is equal to or larger than A2 when RSSI(max) is from P0 to (P0+n1), and A1 is smaller than A2 when RSSI(max) is equal to or larger than (P0+n1+1). The threshold determination unit 452 thus determines (P0+n1) as the threshold T1.

Next, the threshold determination unit 452 compares the CRC accumulation result between LUT2 and LUT3, and determines RSSI(max) in the boundary where the magnitude relation of the CRC accumulation results is reversed as the threshold T2. In the example shown in FIG. 11, A2 is equal to or larger than A3 when RSSI(max) is from P0 to (P0+n2), and A2 becomes smaller than A3 when RSSI(max) is equal to or larger than (P0+n2+1). The threshold determination unit 452 thus determines (P0+n2) as the threshold T2.

Lastly, the threshold determination unit 452 compares the CRC accumulation result between LUT3 and LUT4, to determine RSSI(max) in the boundary where the magnitude relation of the CRC accumulation results is reversed as the threshold T3. In the example shown in FIG. 11, A3 is equal to or larger than A4 when RSSI(max) is from P0 to (P0+n3), and A3 is smaller than A4 when RSSI(max) is equal to or larger than (P0+n3+1). The threshold determination unit 452 thus determines (P0+n3) as the threshold T3.

By setting the threshold T1 to the threshold T3 as stated above, when RSSI(max) is from P0 to (P0+n1), the CRC accumulation result is the highest if LUT1 is used. When RSSI(max) is larger than (P0+n1) and is equal to or smaller than (P0+n2), the CRC accumulation result is the highest if LUT2 is used. Similarly, when RSSI(max) is larger than (P0+n2) and is equal to or smaller than (P0+n3), the CRC accumulation result is the highest if LUT3 is used. When RSSI(max) is larger than (P0+n3), the CRC accumulation result is the highest if LUT4 is used.

Figure 12:
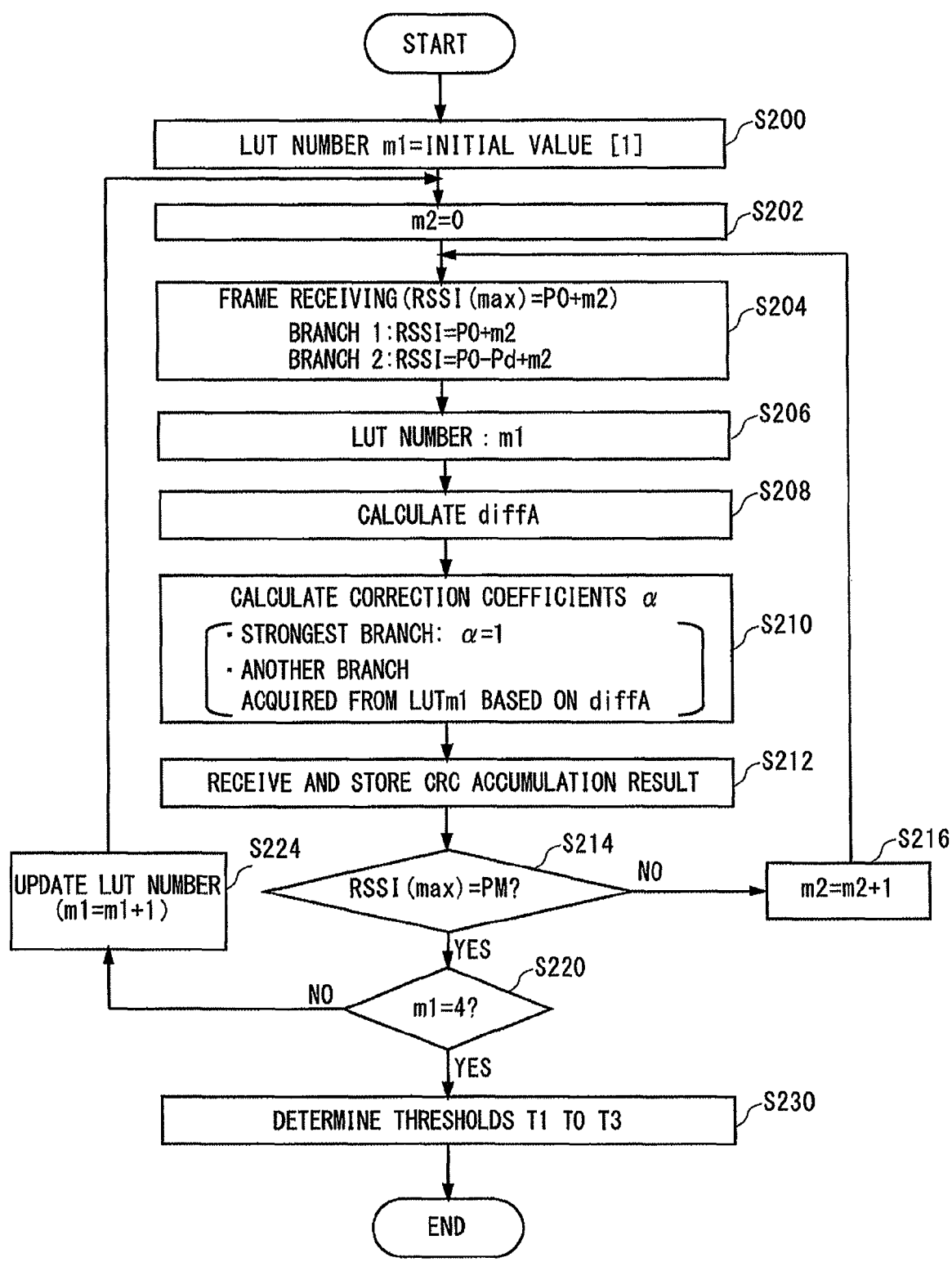
FIG. 12 is a flowchart showing processing for determining the thresholds by the correction coefficient calculation unit shown in FIG. 10.

FIG. 12 is a flowchart showing a process flow when the correction coefficient calculation unit 430 determines the threshold T1 to the threshold T3. This processing is performed when the mode signal is "1". When the mode signal is "0", the correction coefficient calculation unit 430 performs the similar operation as in the correction coefficient calculation unit 330 in the receiving apparatus 300. Description of this case will be omitted.

The flowchart shown in FIG. 12 is an example of repeating sequential transmission of frames to the receiving apparatus 400 the number of times corresponding to the number of LUTs (four in this example) so that RSSI(max) has each of the values from the minimum value P0 to the maximum value PM when the receiving apparatus 400 adjusts the threshold T1 to the threshold T3. As shown in FIG. 12, the frame is first transmitted to the receiving apparatus 400 so that RSSI(max) has the minimum value P0 (S202, S204). For example, as shown in FIG. 12, the branch 1 is set to the strongest branch, and the reception signal R1 and the reception signal R2 are transmitted to the receiving apparatus 400 so that the intensity of the reception signal becomes (P0+m2) (in this example, m2 is 0) for the branch 1 and the intensity of the reception signal becomes (P0−Pd+m2) for the branch 2. Note that Pd denotes the difference of the intensities of the reception signals of the branch 1 and the branch 2.

At this time, the LUT number "1" is input to the selector 442 of the correction coefficient calculation unit 430 through the controller 470, and the selector 442 outputs the LUT number "1" to the LUT storage unit 434 (S206). Further, the difference calculation unit 432 calculates diffA (S208).

Next, the correction coefficient α1 and the correction coefficient α2 of the first branch and the second branch are obtained (S210). Specifically, "1" is added as the correction coefficient of the strongest branch, and the correction coefficient corresponding to diffA calculated in step S208 is obtained from LUT (LUTm1, in this example, LUT1) corresponding to the LUT number output from the selector 442 in step S206 as the correction coefficient of another branch.

The MAC unit 480 then performs CRC processing on the decoding result of the combined signal obtained using the correction coefficient α1 and the correction coefficient α2. The controller 470 then calculates a CRC accumulation result and the storing unit 451 receives the calculation result. The storing unit 451 stores the CRC accumulation result from the controller 470 in association with LUT1 and P0 (S212).

Processing from step S206 to step S212 is then repeated for the next receiving frame, and the storing unit 451 stores the CRC accumulation result in association with LUT1 and (P0+1) (S214: No, S216, S204 to S212).

After that, processing of step S206 to step S212 is repeated until when RSSI(max) becomes the maximum value PM.

As a result, a CRC accumulation result (A1) for each of different values of RSSI(max) for LUT1 in FIG. 11 is obtained.

Subsequently, the LUT number from the outside is incremented by one (S220: No, S224), and processing from steps S202 to S212 is repeated for LUT2.

As a result, a CRC accumulation result (A2) for each of different values of RSSI(max) for LUT2 in FIG. 11 is obtained.

After that, processing of steps S202 to S212 is also repeated for LUT3 and LUT4, whereby each of A3 and A4 in FIG. 11 is obtained.

Fifth Embodiment

Figure 13:
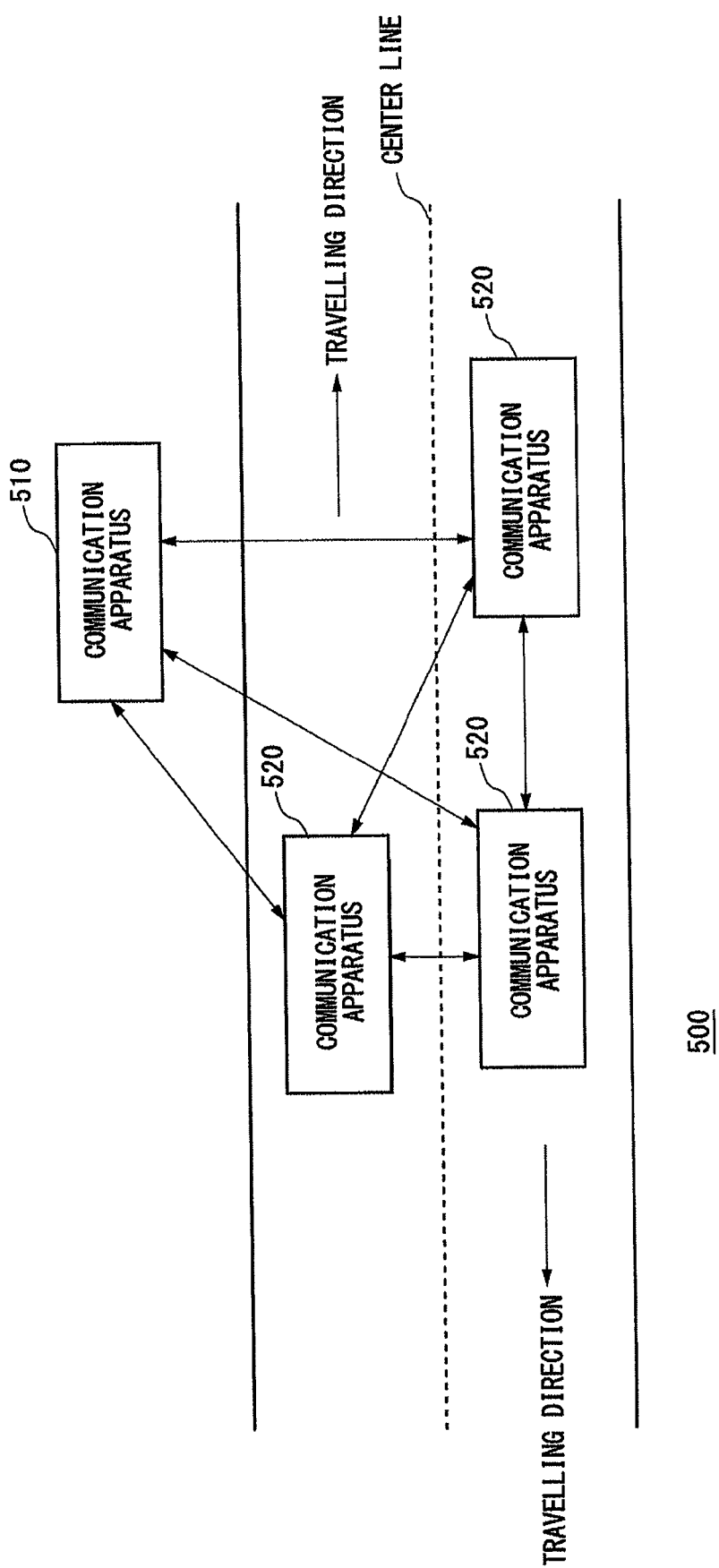
FIG. 13 is a diagram showing a communication system according to a fifth embodiment.

FIG. 13 shows a communication system 500 according to a fifth embodiment. The communication system 500 includes a communication apparatus 510 and a plurality of communication apparatuses 520. The communication system 500 is a communication system for movable bodies. For example, the communication apparatus 510 is a communication apparatus installed at a roadside, and communicates with communication apparatuses installed in passing cars. Further, the communication apparatuses 520 are in-vehicle communication apparatuses, and communicate with the communication apparatus 510 and the communication apparatuses 520 installed in other cars.

Figure 14:
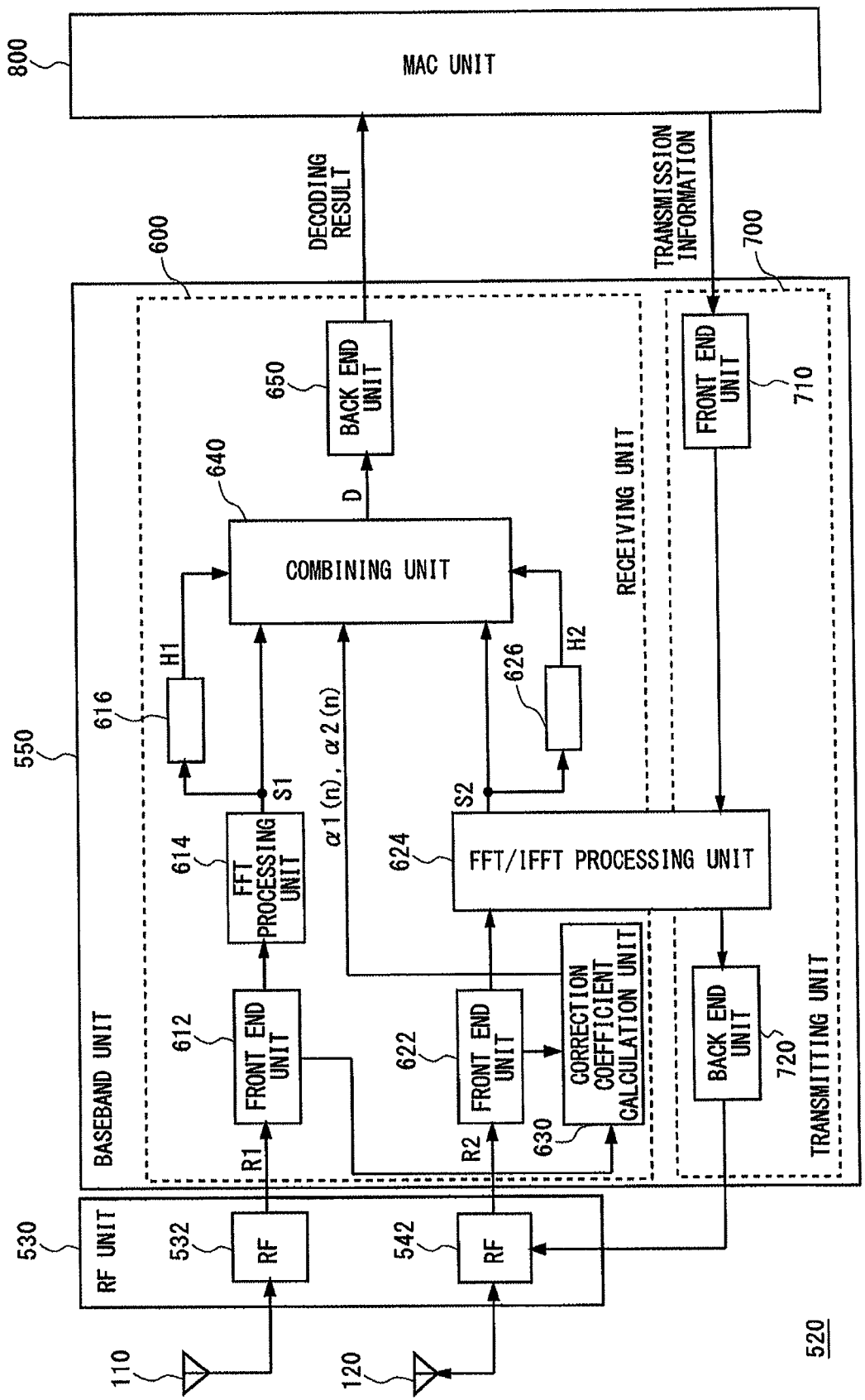
FIG. 14 is a diagram showing a communication apparatus in the communication system shown in FIG. 13.
Figure 15:
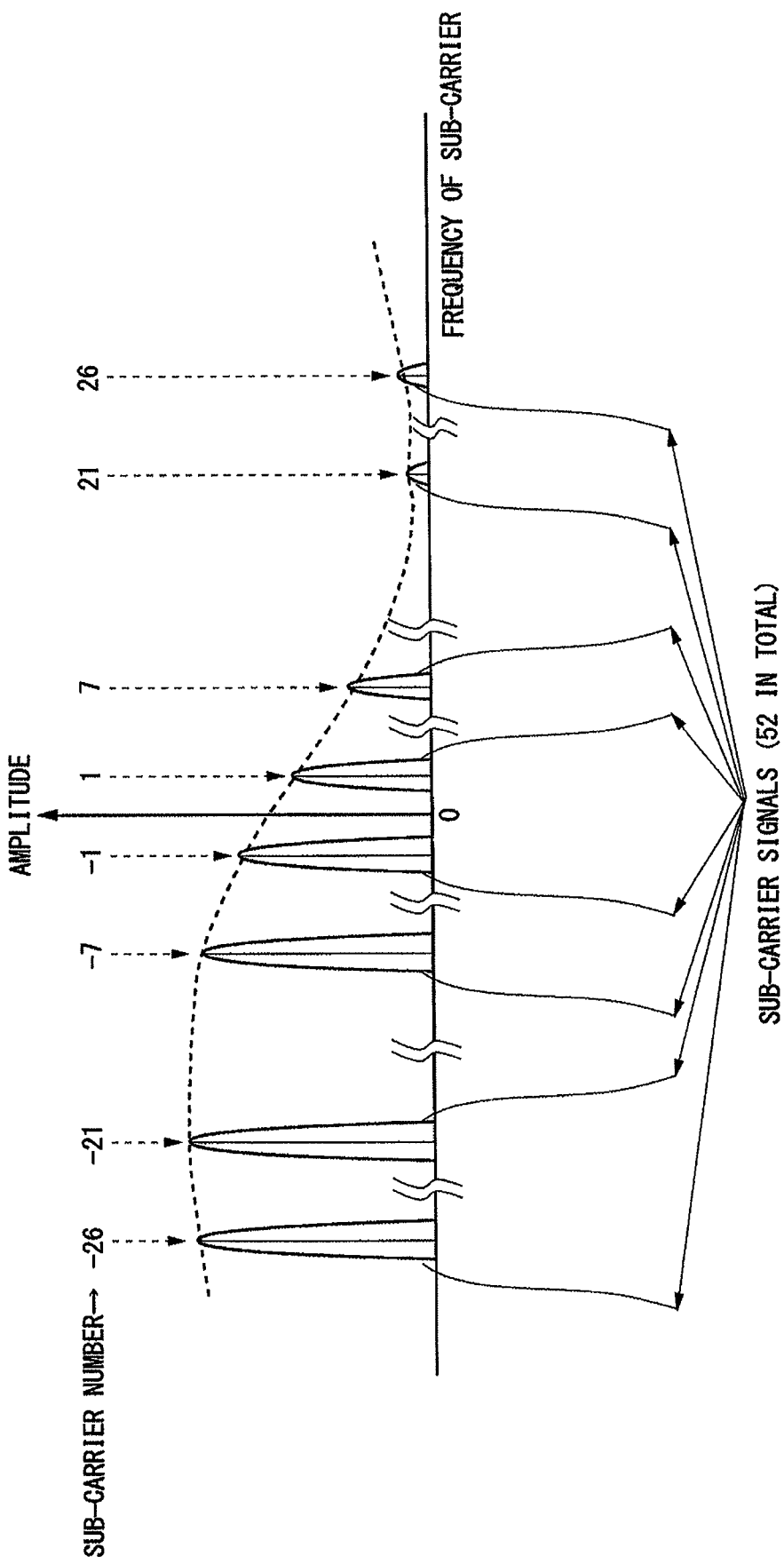
FIG. 15 is a diagram showing each sub-carrier signal obtained by FFT conversion.

The communication apparatus 510 and the communication apparatuses 520 have a similar configuration. The communication apparatus 520 will now be described as a representative example. FIG. 14 shows the communication apparatus 520. The communication apparatus 520 includes two antennas (antenna 110 and 120), a radio frequency (RF) unit 530, a baseband unit 550, and a media access control (MAC) unit 800. The communication apparatus 520 performs two-branch diversity reception at a time of reception.

The RF unit 530 includes an RF unit for first branch 532 and an RF unit for second branch 542. The RF unit 532 performs conversion of a frequency band on a signal received by the antenna 110 (first branch signal) to output the signal to a receiving unit 600 of the baseband unit 550. The RF unit 542 performs conversion of a frequency band on a signal received by the antenna 120 (second branch signal) to output the signal to the receiving unit 600.

The baseband unit 550 includes the receiving unit 600 and a transmitting unit 700.

The receiving unit 600 is the receiving apparatus 300 as shown in FIG. 6, for example. A front end unit 612, an FFT processing unit 614, and a transmission path response estimation unit 616 in the receiving unit 600 are similar to the front end unit 112, the FFT processing unit 114, and the transmission path response estimation unit 116 in the receiving apparatus 300, respectively.

Further, a front end unit 622 and a transmission path response estimation unit 626 in the receiving unit 600 are also similar to the front end unit 122 and the transmission path response estimation unit 126 in the receiving apparatus 300, respectively.

An FFT/IFFT processing unit 624 includes an inverse fast Fourier transform (IFFT) function in addition to the similar function as the FFT processing unit 124 in the receiving apparatus 300. This IFFT function is used for a transmission operation by the communication apparatus 520. An FFT processing functional part of the FFT/IFFT processing unit 624 is included in the receiving unit 600, and an IFFT processing functional part of the FFT/IFFT processing unit 624 is included in the transmitting unit 700.

Further, a correction coefficient calculation unit 630 and a combining unit 640 in the receiving unit 600 are similar to the correction coefficient calculation unit 330 and the combining unit 240 in the receiving apparatus 300, respectively.

A back end unit 650 performs processing such as Viterbi decoding on a combined signal D obtained by the combining unit 640, and outputs the decoding result to the MAC unit 800.

The transmitting unit 700 includes a front end unit 710, the IFFT processing functional part of the FFT/IFFT processing unit 624, and a back end unit 720.

The front end unit 710 receives transmission information from the MAC unit 800, performs processing such as coding to obtain a sub-carrier signal, and outputs the sub-carrier signal to the FFT/IFFT processing unit 624.

The FFT/IFFT processing unit 624 performs IFFT processing on the output from the front end unit 710 to obtain a time domain symbol signal, and outputs the symbol signal to the back end unit 720.

The back end unit 720 converts the output from the FFT/IFFT processing unit 624 into an OFDM-based signal, to output the OFDM-based signal to the RF unit 542.

The RF unit 542 performs frequency band conversion processing inverse to the processing at the time of reception on the signal from the back end unit 720, and transmits the signal after the processing through the antenna 120.

The MAC unit 800 performs processing of a MAC layer, and is similar to that included in this type of communication apparatus. Detailed description thereof will be omitted.

While the receiving apparatus 300 has been used as the receiving unit 600 as an example in the communication system 500, the receiving apparatus according to any one of the embodiments stated above may be used as the receiving unit 600. As a matter of course, it is possible to obtain all the effects of the receiving apparatus that is used.

While the invention has been described in terms of several embodiments, those skilled in the art will recognize that the invention can be practiced with various modifications within the spirit and scope of the appended claims and the invention is not limited to the examples described above.

For example, these embodiments can be combined as desirable by one of ordinary skill in the art.

Further, the scope of the claims is not limited by the embodiments described above.

Furthermore, it is noted that, Applicant's intent is to encompass equivalents of all claim elements, even if amended later during prosecution.

What is claimed is:

1. A receiving apparatus that diversity-receives a transmission signal of orthogonal frequency division multiplexing system, the receiving apparatus comprising:
    a correction coefficient calculation unit that obtains correction coefficients according to a magnitude relation of an intensity of a reception signal of each branch, the correction coefficients being smaller in branches with smaller reception signal intensities;
    a Fourier transformer that performs Fourier transform on the reception signal for each branch to output sub-carrier signals corresponding to respective sub-carriers;
    a transmission path response estimation unit that estimates a transmission path response for each of the sub-carrier signals for each branch; and
    a combining unit that corrects, for each sub-carrier, when obtaining a combined signal by maximum ratio combining by performing a weighted addition on the sub-carrier signal of each branch based on the transmission path response of each branch estimated by the transmission path response estimation unit, a weighting coefficient with each of the correction coefficients calculated by the correction coefficient calculation unit.

2. The receiving apparatus according to claim 1, wherein the combining unit combines the sub-carrier signal of each branch by an operation according to a combining operation expression, and
    the combining operation expression is an expression obtained by multiplying each of terms of a numerator part and a denominator part of a polynomial expression formed of terms corresponding to the respective transmission path responses of the branches in a maximum ratio combining operation expression which is an operation expression in the maximum ratio combining by the correction coefficient calculated for a branch corresponding to the term by the correction coefficient calculation unit.

3. The receiving apparatus according to claim 1, wherein the combining unit corrects the transmission path response of each branch estimated by the transmission path response estimation unit by multiplying it by the correction coefficient of the branch calculated by the correction coefficient calculation unit, to calculate a weighting coefficient when combining the sub-carrier signal of each branch at a maximum ratio using the transmission path response of each branch after correction.

4. The receiving apparatus according to claim 1, wherein the correction coefficient calculation unit uses an intensity of a synchronization signal provided at a top of a frame of the reception signal as an intensity of the reception signal of each symbol included in the frame.

5. The receiving apparatus according to claim 4, further comprising:
    an A/D converter that converts the reception signal into a digital signal for each branch to supply the digital signal to the Fourier transformer; and
    an AGC unit that performs auto gain control (AGC) for each branch to adjust a gain of the reception signal input to the A/D converter,
    wherein the correction coefficient calculation unit uses an intensity of a short preamble in a frame of the reception signal obtained by the AGC unit as an intensity of the synchronization signal.

6. The receiving apparatus according to claim 5, wherein the correction coefficient calculation unit adds a maximum correction coefficient for the strongest branch which is a branch having the largest reception signal intensity, and obtains, for each of the other branches, the correction coefficient equal to or smaller than the maximum correction coefficient according to a difference in the intensities of the branch and the strongest branch.

7. The receiving apparatus according to claim 6, wherein the correction coefficient calculation unit obtains, for each of the other branches, the correction coefficient so that the correction coefficients become larger with increasing intensity of the strongest branch.

8. The receiving apparatus according to claim 7, further comprising:
    a plurality of look up tables (LUTs) indicating a corresponding relation between a difference in the intensity and the correction coefficient set for each of a plurality of intensity ranges specified by a plurality of thresholds, wherein in each of the LUTs, the correction coefficient becomes smaller with increasing difference in the intensity, in the plurality of LUTs, the correction coefficients in the LUTs are larger in the LUTs set for the intensity ranges corresponding to larger intensities with respect to the same difference in the intensity, and the correction coefficient calculation unit selects, for each of the other branches, the LUT set for the intensity range including the intensity of the strongest branch to obtain the correction coefficient by the LUT that is selected.

9. The receiving apparatus according to claim 8, further comprising a back end unit that performs processing including decoding on the combined signal obtained by the combining unit, wherein the correction coefficient calculation unit is able to adjust the plurality of thresholds based on a result of cyclic redundancy check (CRC) processing for a result of decoding obtained by the back end unit.

10. A communication apparatus comprising:

a transmitting unit that generates and transmits a transmission signal of orthogonal frequency division multiplexing system; and a receiving unit that diversity-receives the transmission signal of orthogonal frequency division multiplexing system, wherein the receiving unit is the receiving apparatus according to claim 1.

11. A communication system comprising a plurality of communication apparatuses that perform transmission or reception of a transmission signal of orthogonal frequency division multiplexing system, wherein at least one of the communication apparatuses comprises the receiving apparatus according to claims 1.

12. A receiving apparatus that diversity-receives a transmission signal of orthogonal frequency division multiplexing system, the receiving apparatus comprising:

for each branch, an antenna;

a front end unit that receives a reception signal received by the antenna, and performs processing including an A/D conversion and auto gain control (AGC) processing that adjusts a gain of the reception signal subjected to the A/D conversion;

a Fourier transformer that performs Fourier transform on a digital signal obtained by the front end unit to output sub-carrier signals corresponding to respective sub-carriers; and a transmission path response estimation unit that estimates a transmission path response for each of the sub-carrier signals output from the Fourier transformer, the receiving apparatus further comprising:

a correction coefficient calculation unit that receives an intensity of the reception signal obtained at the front end unit from the front end unit of each branch, to obtain correction coefficients according to a magnitude relation of the intensity of the reception signal of each branch, the correction coefficients being smaller in branches with smaller reception signal intensities; and a combining unit that is connected to the correction coefficient calculation unit, and the Fourier transformer and the transmission path response estimation unit of each branch, and corrects, for each sub-carrier, when obtaining a combined signal by performing maximum ratio combining by performing a weighted addition on the sub-carrier signal of each branch based on the transmission path response of each branch estimated by the transmission path response estimation unit, a weighting coefficient with each of the correction coefficients calculated by the correction coefficient calculation unit.

13. The receiving apparatus according to claim 12, wherein the combining unit combines the sub-carrier signal of each branch by an operation according to a combining operation expression, and the combining operation expression is an expression obtained by multiplying each of terms of a numerator part and a denominator part of a polynomial expression formed of terms corresponding to the respective transmission path responses of the branches in a maximum ratio combining operation expression which is an operation expression in the maximum ratio combining by the correction coefficient calculated for a branch corresponding to the term by the correction coefficient calculation unit.

14. The receiving apparatus according to claim 12, wherein the combining unit corrects the transmission path response of each branch estimated by the transmission path response estimation unit by multiplying it by the correction coefficient of the branch calculated by the correction coefficient calculation unit, to calculate a weighting coefficient when combining the sub-carrier signal of each branch at a maximum ratio using the transmission path response of each branch after correction.

15. The receiving apparatus according to claims 12, wherein the correction coefficient calculation unit uses an intensity of a synchronization signal provided at a top of a frame of the reception signal as an intensity of the reception signal of each symbol included in the frame.

16. The receiving apparatus according to claim 15, wherein the correction coefficient calculation unit uses an intensity of a short preamble in a frame of the reception signal obtained by the front end unit in the AGC processing as an intensity of the synchronization signal.

17. The receiving apparatus according to claim 16, wherein the correction coefficient calculation unit adds a maximum correction coefficient for the strongest branch which is a branch having the largest reception signal intensity, and obtains, for each of the other branches, the correction coefficient equal to or smaller than the maximum correction coefficient according to a difference in the intensities of the branch and the strongest branch.

18. The receiving apparatus according to claim 17, wherein the correction coefficient calculation unit obtains, for each of the other branches, the correction coefficient so that the correction coefficients become larger with increasing intensity of the strongest branch.

19. The receiving apparatus according to claim 18, further comprising:

a plurality of look up tables (LUTs) indicating a corresponding relation between a difference in the intensity and the correction coefficient set for each of a plurality of intensity ranges specified by a plurality of thresholds, wherein in each of the LUTs, the correction coefficient becomes smaller with increasing difference in the intensity, in the plurality of LUTs, the correction coefficients in the LUTs are larger in the LUTs set for the intensity ranges corresponding to large intensities with respect to the same difference in the intensity, and the correction coefficient calculation unit selects, for each of the other branches, the LUT set for the intensity range including the intensity of the strongest branch to obtain the correction coefficient by the LUT that is selected.

20. The receiving apparatus according to claim 19, further comprising a back end unit that performs processing including decoding on the combined signal obtained by the combining unit,
  wherein the correction coefficient calculation unit is able to adjust the plurality of thresholds based on a result of cyclic redundancy check (CRC) processing for a result of decoding obtained by the back end unit.

* * * * *